(12) United States Patent
Glovinsky et al.

(10) Patent No.: US 10,819,275 B2
(45) Date of Patent: Oct. 27, 2020

(54) METHOD AND APPARATUS FOR SWITCHING CURRENT

(71) Applicant: Solaredge Technologies Ltd., Herziliya Pituach (IL)

(72) Inventors: Tzachi Glovinsky, Petah Tikva (IL); Ilan Yoscovich, Ramat Gan (IL)

(73) Assignee: Solaredge Technologies Ltd., Herzeliya (IL)

( * ) Notice: Subject to any disclaimer, the term of this patent is extended or adjusted under 35 U.S.C. 154(b) by 843 days.

(21) Appl. No.: 15/292,780

(22) Filed: Oct. 13, 2016

(65) Prior Publication Data

US 2017/0110873 A1    Apr. 20, 2017

Related U.S. Application Data

(60) Provisional application No. 62/241,417, filed on Oct. 14, 2015.

(51) Int. Cl.
| | |
|---|---|
| *H02H 3/08* | (2006.01) |
| *H02H 1/00* | (2006.01) |
| *H02S 40/30* | (2014.01) |
| *H02H 3/33* | (2006.01) |

(52) U.S. Cl.
CPC ............. *H02S 40/30* (2014.12); *H02H 3/33* (2013.01); *H02H 1/0007* (2013.01)

(58) Field of Classification Search
CPC .... H01H 83/04; H01H 71/125; H02H 1/0007; H02H 3/00; H02H 3/162; H02H 3/165; H02H 3/26; H02H 3/32; H02H 3/325; H02H 3/33; H02H 3/335; H02H 1/046; H02S 40/30

USPC ...... 361/42, 44, 45, 46, 47, 48, 49, 50, 93.6
See application file for complete search history.

(56) References Cited

U.S. PATENT DOCUMENTS

| | | | | |
|---|---|---|---|---|
| 5,539,602 A | * | 7/1996 | Schmitz | H02H 3/32 361/42 |
| 6,566,855 B1 | * | 5/2003 | Nguyen | G01R 19/252 324/117 H |
| 7,936,543 B2 | | 5/2011 | Restrepo et al. | |
| 2007/0208520 A1 | * | 9/2007 | Zhang | H02H 1/0015 702/58 |

(Continued)

FOREIGN PATENT DOCUMENTS

| | | |
|---|---|---|
| CN | 101395777 A | 3/2009 |
| CN | 101816108 A | 8/2010 |

(Continued)

OTHER PUBLICATIONS

European Search Report—EP Appl. 16193624.0—dated Mar. 23, 2017.
CN Office Action for 201610896208.5, dated Dec. 31, 2019.

*Primary Examiner* — Jared Fureman
*Assistant Examiner* — Nicolas Bellido
(74) *Attorney, Agent, or Firm* — Banner & Witcoff, Ltd.

(57) ABSTRACT

A device, system, and method is disclosed for improving safety of a power system. For example, a differential current may be detected using at least one sensor by temporarily enabling sampling of current flowing through one or more conductors. Additionally, current flow may be temporarily altered in order to sample current in a system. The measurements may be handled locally and/or remotely and appropriate actions may be taken to enhance the overall safety of the system.

18 Claims, 15 Drawing Sheets

(56) References Cited

U.S. PATENT DOCUMENTS

| | | | | |
|---|---|---|---|---|
| 2008/0258563 A1* | 10/2008 | Hodges | ............ | H01R 13/7038 |
| | | | | 307/112 |
| 2009/0207764 A1* | 8/2009 | Fukamachi | ............ | H04B 1/44 |
| | | | | 370/297 |
| 2010/0225377 A1* | 9/2010 | Okashita | ............ | H03K 17/063 |
| | | | | 327/427 |
| 2014/0153144 A1 | 6/2014 | Lacey et al. | | |
| 2016/0301200 A1* | 10/2016 | Niehoff | ................ | H02H 3/021 |
| 2016/0314928 A1* | 10/2016 | Niehoff | ................ | H01H 83/04 |

FOREIGN PATENT DOCUMENTS

| | | | | |
|---|---|---|---|---|
| CN | 101900771 A | 12/2010 | | |
| CN | 104111366 A | 10/2014 | | |
| CN | 104620345 A | 5/2015 | | |
| EP | 1562213 B1 * | 4/2007 | ............ | H01H 83/04 |
| WO | WO-2005086310 A1 * | 9/2005 | ............ | H02H 3/066 |
| WO | 2009/043807 A2 | 4/2009 | | |

\* cited by examiner

METHOD AND APPARATUS FOR SWITCHING CURRENT

CROSS-REFERENCE TO RELATED APPLICATIONS

The present application claims the priority benefit of U.S. Provisional Patent Application No. 62/241,417, filed Oct. 14, 2015, entitled Fault Detection System and Circuits. The patents and patent applications listed in this paragraph are hereby incorporated by reference in their entireties.

BACKGROUND

Current devices, such as a residual current detector (RCD), which may also be referred to as a ground fault detector interrupter (GFDI), may be variously configured. In certain embodiments, current devices may be an electrical safety device which may act to protect against certain electrical conditions by detecting a condition and/or disconnecting a circuit upon detection of an anomalous condition such as a leakage (residual) current in the circuit. An RCD may include any number of components and functions but often includes a differential current-sensing device which measures the differential current between two or more wires. If the wires are carrying a direct current (DC), one wire may be an energized (i.e., "live") wire, and one wire may be a return wire. In certain RCDs, there is the ability to detect whether or not some current may be "leaking" out of the circuit, which could be an indication of a potential safety hazard.

Conventional RCDs are typically large and expensive and some utilize a heavy transformer. Conventionally, the larger the current, the larger and more expensive the RCD. Furthermore, conventional RCDs lack an ability to adequately detect and protect against DC leakage current in high current applications. For example, in a transformer, the current induced in the secondary windings is typically proportional to the differential core flux, which may be constant for a DC current.

There is a need for a low-cost RCD which can detect both alternating current (AC) and direct current (DC) differential currents, operate cost effectively even for large currents, operate quickly to improve safety, and provide a simple and reliable mechanism to improve overall safety. The need for differential DC current detection is particularly acute in photovoltaic (PV) systems which often feature high DC currents, exposed environments, residential customers, and potentially unsophisticated users.

SUMMARY

The following is a short summary of some of the inventive concepts for illustrative purposes only, and is not intended to limit or constrain the inventions and examples in the detailed description. One skilled in the art will recognize other novel combinations and features from the detailed description.

Embodiments herein may employ an RCD with a specialized current directing system which enables a low-cost RCD capable of detecting both AC and DC currents.

In exemplary RCDs, a circuit (e.g., a switching circuit) may be utilized to reduce the cost and improve the reliability of the system. For example, in the event of the need to determine a differential current between two wires, an exemplary current directing system may create a high-frequency current component which may be detected by a suitable circuit component such as a sensor. In some embodiments, the cost of a current-transformer capable of detecting high-frequency currents may be substantially lower than the cost of a current-transformer for detecting low-frequency currents. In some embodiments, the RCD may include a suitable circuit (e.g., switches such as MOSFET switches). These circuits may be variously configured in operation. In exemplary embodiments where the circuit includes switches, the switches may be switched such that they are staggered in their operation so that the turning on and off of switches (e.g., MOSFET switches) may proceed at a suitable frequency (e.g., at higher frequency than grid frequency) and may be timed using a suitable timing (e.g., the current may be temporarily allowed to flow through a suitable circuit such as the primary and/or secondary windings of the current transformer). In some embodiments, the current may be allowed to flow through the current transformer, but the current sensing may be enabled for a predetermined period of time, e.g., for a short time such as less than 0.5 seconds, or less than 0.1 seconds, or even less than 0.001 seconds. In a preferred embodiment, the current sensing may be enabled for even less time, e.g. for 10 usec (i.e. 0.000001 seconds).

In exemplary RCDs, there exist several options for use of the sensor measurements. In some embodiments, upon detection of a differential current, safety relays may be opened, disconnecting the live wires. In other embodiments, a user interface may be updated to reflect the current state of operation. In some embodiments, the data may be transmitted to computational systems where it is collected and processed for further analysis.

The exemplary RCDs may be applied to a wide variety of electrical systems. For example, they can be used to detect differential current in residential, commercial or high-voltage AC systems. They may also be used to detect differential current in DC systems, such as photovoltaic systems or other systems generating or consuming DC power.

In still further embodiments, because the cost and size of the RCD in accordance with embodiments herein may be reduced and the reliability may be increased, and because the RCD may detect both AC and DC leakage currents and/or resistance, a plurality of RCDs may be distributed throughout the system and/or embedded in various components such as optimizers, inverters, micro inverters, solar panels, switches, AC boxes, DC boxes, bus bars, and fuses so that leakage currents and other potential fault conditions may be isolated, localized, and detected, at the time of occurrence of the fault and/or reported and further reconfigured to enable graceful degradation of the system while still allowing for high levels of safety. For example, in the event of detecting a DC leakage current in a solar panel, that solar panel may be shut down and/or isolated from the remainder of the system while the rest of the system is maintained at operational levels. The error may be reported back to the home owner and to the solar panel installer for corrective action and/or the system itself may correct the issue in real time, thus improving overall safety for a typical operation.

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. A more complete understanding of the present disclosure and the advantages thereof may be acquired by referring to the following description in consideration of the accompanying drawings, in which like reference numbers indicate like features, and wherein:

DETAILED DESCRIPTION

Figure 1:
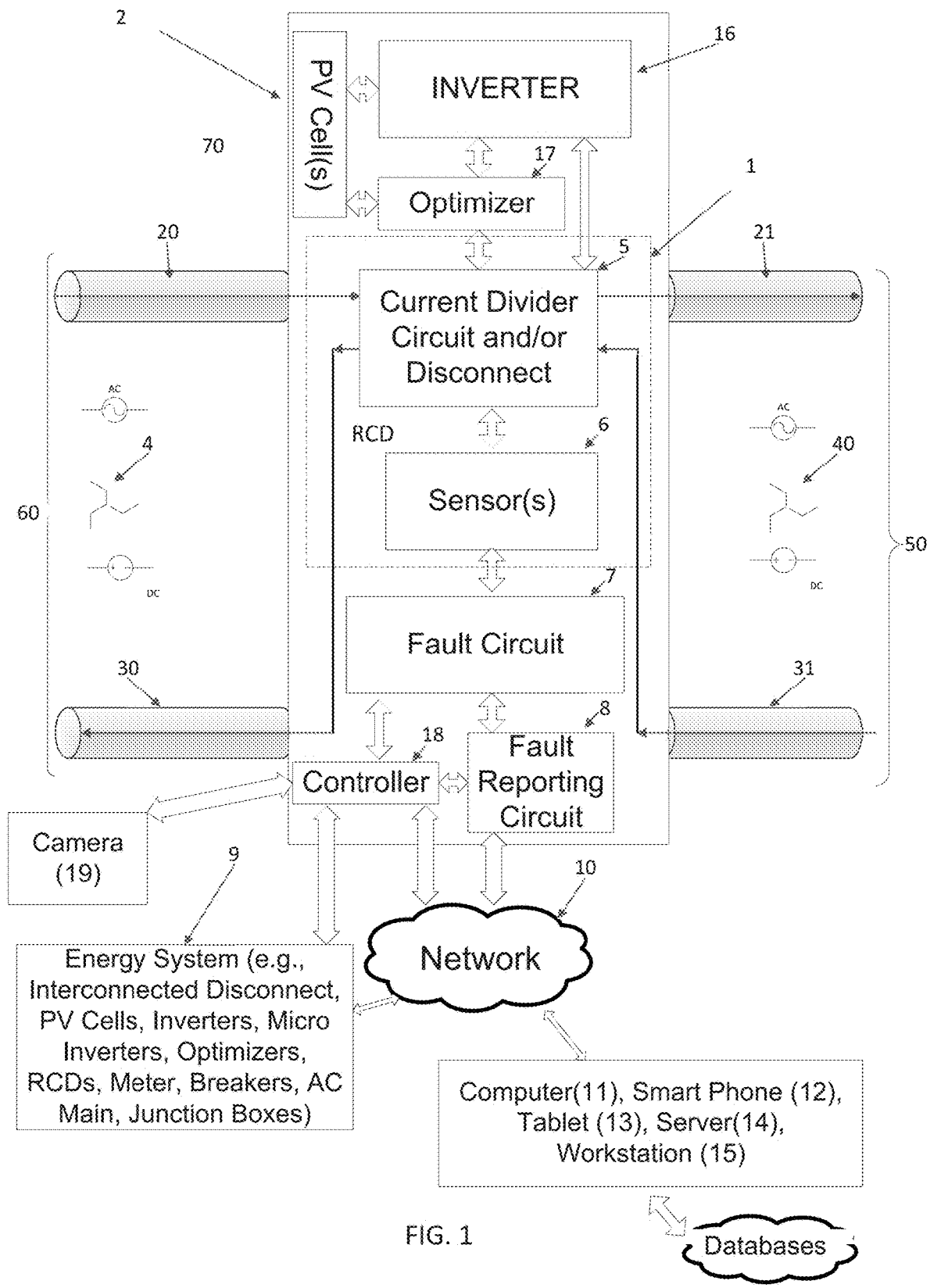
FIGS. 1, 2A-2B are part schematic, part block diagrams of exemplary embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure. Referring to FIG. 1, a protected element(s) 2 may be variously configured. In one embodiment, the protected element(s) 2 may include a residual current device 1. The residual current device 1 may itself be variously configured. For example, the residual current device 1 may include a current divider circuit and/or disconnect 5 and/or one or more sensors 6 (e.g., a current sensor). The residual current device 1 may comprise, act as, or be referred to as a Ground Fault Detector Interrupter (GFDI). The current divider circuit and/or disconnect 5 may be configured as one or more switches (e.g., MOSFET switch(s), and/or one or more current dividers which may or may not be coupled to one or more disconnects). The current divider circuit and/or disconnect 5 may receive AC, DC, or three phase current 4 on an input side 60 via conductor 20 and conductor 30. The current divider circuit and/or disconnect 5 may output AC, DC, or three phase current 40 on output side 50 via conductor 21 or conductor 31. Examples of various residual current devices 1 in accordance with various embodiments herein are shown in FIGS. 2A, 2B, 2C, 4-9, and 12. The protected element(s) 2 may optionally comprise other devices such as one or more photo voltaic cell(s)/array(s) 70, one or more inverters 16 (e.g., a micro inverter), one or more optimizers 17, one or more fault circuits 7 (e.g., a fault detection/fault indicator), one or more fault reporting circuit(s) 8, and/or one or more controller(s) 18. The controller(s) 18 may be variously configured. The controllers may be hardware, logic circuits, processor(s) (e.g., microprocessors, signal processors, and/or micro controllers) and/or may be implemented via software. The controller may include an A/D converter on one or more ports for interfacing to the sensor(s) 6 and/or for taking direct measurement of various conductors and/or other devices in the protected element(s) 2 such as PV cell(s)/arrays, inverter(s) 16, and/or optimizer(s) 17. The controller(s) 18 may also be implemented as one or more application-specific integrated circuits (ASICs) and may also include sensor(s) 6 integrated into the ASIC(s). The controller(s) 18 may also interact or cooperate with other systems, circuits, components, or devices such as inverter(s) 16, optimizer(s) 17, fault circuit 7, fault reporting circuit 8 and/or disconnect(s). The one or more controller(s) 18 and/or the fault reporting circuit(s) 8 may be coupled to any number of other devices and/or systems such as energy systems 9 (e.g., various discrete and/or interconnected devices such as disconnect(s), PV cell(s)/array(s), inverter(s), micro inverter(s), optimizer(s), other residual current device(s), meter(s), breaker(s), AC main(s), junction box(es), camera etc.), network(s)/Intranet/Internet 10, computing devices 11, smart phone devices 12, tablet devices 13, camera 19, one or more servers 14 which may include data bases 15a and/or work stations 15. The controller(s) 18 may be configured for controlling the operation of components within the protected element(s) 2 and/or for controlling the interactions with other elements coupled to the protected element(s) 2.

Again referring to FIG. 1, a residual current device 1 may be variously configured to include any suitable circuitry for sensing various parameters such as current and/or voltage. For example, the circuitry may sense steady state and/or transient current and/or voltage. Where the sensor(s) 6 is a current sensor, the current sensor may be variously configured to detect AC and/or DC (e.g., single and/or multiple phase) currents and produce an analog and/or digital indication of the sensed current. Sensor(s) 6 may be variously configured and may optionally include a number of multimeter sensors including AC and/or DC voltage measurements, AC and/or DC current, capacitance (e.g., parasitic capacitance) measurements, AD and/or DC current and/or voltage transient measurements, and/or resistance measurements. Where the sensor(s) 6 includes current sensor(s), the current sensor(s) may be inductive current sensors, Hall Effect current sensors, resistive elements coupled to an operational amplifier current sensor, resistance elements coupled across voltage sensors, magneto resistive current sensors, current transformers with, for example, primary and/or secondary windings, and/or a measuring element such as resistor/voltage sensors, Rogowski coil current sensor(s), fiber optic current sensors, etc. The sensor(s) 6 may be controlled by and/or sampled using the controller(s) 18. For example, the controller(s) 18 may include a microcontroller, microprocessor, state machine, ASIC, and/or digital signal processor. In one exemplary algorithm or implementation, the controller(s) 18 may operate the current divider circuit and/or disconnect 5 to sample AC and/or DC current, voltage, and/or resistance. The controller may actuate and configure the sensors and the current divider circuit and/or disconnect to sample various electrical values and then make determinations about the likely conditions present in the protected element(s) 2. An exemplary algorithm for operating these circuits is described in more detail at various locations herein, e.g., see below with respect to FIG. 2C, which is applicable to the circuits shown in, for example, FIG. 2A, 2B, or 4-9. For example, by controlling various current diverting circuits (e.g., circuits including switches) within the current divider and/or disconnect circuit 5, the controller(s) 18 may control overlap periods between various current flows, may control and/or isolate various conditions such as current flows and/or voltages on certain wires and/or components (e.g., PV cell(s), inverters, micro inverters, optimizers, single or multi-phase alternating current (AC) conductors, DC input line conductors, DC output line conductors, DC input return conductors, and DC output return conductors). These conditions may be captured using signal processing analysis (e.g., see FIG. 2C and FIG. 3) and decisions/alarms made either by the controller(s) 18 locally and/or by one or more remote components (e.g., energy system 9, computer 11, servers 14, smart phone 12, and/or tablet 13). The decisions may detail corrective actions and/or reporting conditions depending on the measured conditions of the protected element(s) 2. Conductors 20, 21 and conductors 30, 31 may or may not form a part of the sensor. For example, in certain embodiments, conductor 20 and/or conductor 21 and/or conductor 30 and/or conductor 31 may themselves function as part of the current sensor, e.g., as the primary and/or secondary windings of a transformer. Other sensors may include resistance sensors, parasitic capacitance sensors, and/or voltage sensors. These sensors may be variously utilized such as in fault categorization, fault detection, fault prediction, and/or fault localization. They may also be configured for detecting transient faults that, for example, only occur during certain conditions such as certain weather and/or temperature conditions.

The protected element(s) 2 may be coupled to external devices, circuits, and/or networks. For example, in certain embodiments, the protected element(s) 2 may be coupled to a wired and/or wireless network(s)/Internet/Intranet 10, and/or any number of end user device(s) such as computer 11, smart phone 12, tablet 13 and/or other devices such as servers 14 which may be located at a network operations center and/or power generation monitoring center. These devices may be utilized to generate a warning of a dangerous condition, determine when a dangerous condition is probable, detect the type of dangerous condition, detect current or impending circuit faults and/or take action to degrade or turn off certain portions of the energy system 9. These warnings can be audio and/or visual. They may, for example, be a beep, tone, siren, LED, and/or high lumen LED. They may be located in the home, on the roof, and/or in the energy system 9. For example, the warnings may be centralized such as in servers 14 and/or distributed to end user devices (e.g., computers 11, smart phones 12, and/or tablets 13). The warnings may be shown on displays coupled, attached, and/or embedded into various components of energy system(s) 9 such as disconnects, PV cells/arrays, inverters, micro inverters, optimizers, residential current devices, meters, breakers, main, and/or junction boxes. The warnings may be variously coupled to a user's/installer's cell phone and/or other personal device to warn the user and/or installer when he or she is approaching a circuit in a dangerous condition. The warnings may be coupled to GPS coordinates and/or generated in response to a device (e.g., smart phone 12 and/or tablet 13) moving in a location proximate to a hazard condition. Readings from the sensor(s) 6 may be analyzed locally and/or sent to another device for further analysis, storage and review. Databases 15A may be utilized to learn the characteristics of the system and/or actual/potential faults associated with the system by analyzing sensor data, learning the type of fault, and through an artificial intelligence algorithm locating the most likely location of the fault and most likely mode of the fault (e.g., short circuit of PV panel). Sensor readings may be analyzed over time to determine changes in conditions that may impact overall safety, such as gradually degrading insulation on a wire, and/or indicate other conditions that may be of interest, such as increased leakage current. For example, readings may be stored and analyzed using servers 14 and/or databases 15*a*. This may include readings indicative of a system state which is safe (e.g. zero readings) and readings indicative of a system state which is potentially unsafe (e.g., nonzero readings). For example, each of the residual current devices 1 may be interrogated to determine whether the faulty and/or potentially faulty condition exists at the string level, at the optimizer/module level, and/or at the single component level, such as a power optimizer, micro inverter and/or PV cell/array level. The residual current devices 1 may also be configured to allow for checking the wiring and bus networks between components. The residual current devices 1 may be configured to detect ground faults, capacitive discharge, and other conditions such as resistance of AC and/or DC cables, strings, combiner boxes and/or cabling to various devices such as inverters 16, optimizers 17, and/or PV cell(s)/arrays 70. One or more switches and/or disconnects may be utilized to isolate one or more wires and/or conductors while resistance measurements are made along the wire and/or between various components such as a wire/conductor and ground, and between different conductors. For example, where the resistance between a wire and/or other component and ground is below some predetermined value, the wire and/or component may be considered faulty. Where the residual current devices are distributed, they may serve as a primary fault detection and localization device, making the overall system far more user and/or installer friendly and more importantly, safer for the entity hosting the energy system 9.

The residual current device 1 may be configurable to be internal and/or external, type A and/or type B. For example, the residual current device 1 may be configured to be internal, external, type A, or type B based on local electrical codes. Where the residual current device 1 is configurable, the installer may configure the device based on configuration parameters to conform to local electrical codes of wherever the device is being installed. For example, embodiments may alter the trip current thresholds, may set different thresholds for rapid changes in leakage versus slow changes in leakage, may set different thresholds for single phase and multi-phase, determine the reset characteristics (manual and/or automatic), may set priority interrupts to troubleshoot intermittent faults (e.g., during a weather event) before the fault disappears, and/or may configure how current surges are handled. For example, a trip current threshold may be set to as low as 1 mA or 5 mA, or 30 mA, or as high as 100 mA or 500 mA, depending on a level of risk set by an installer and/or potentially dangerous conditions. Where embodiments include the installer reconfiguring the trip threshold, the trip threshold may be increased in response to a false-alarm or decreased in case of a reduced tolerance for risk. In a preferred embodiment, the threshold may be set to a level designed to prevent danger of electrocution to a human, for example, 30 mA. In another embodiment, the threshold may be set to a level designed to prevent fire, for examples, hundreds of mA. Where embodiments sample the current via a current divider circuit and/or disconnect 6 such as a switch, the device may be substantially reduced in cost and/or integrated. This allows the device to be easily configurable by the operator using any suitable configuration device such as smart phone 12 with a suitable installer application.

Figure 2A:
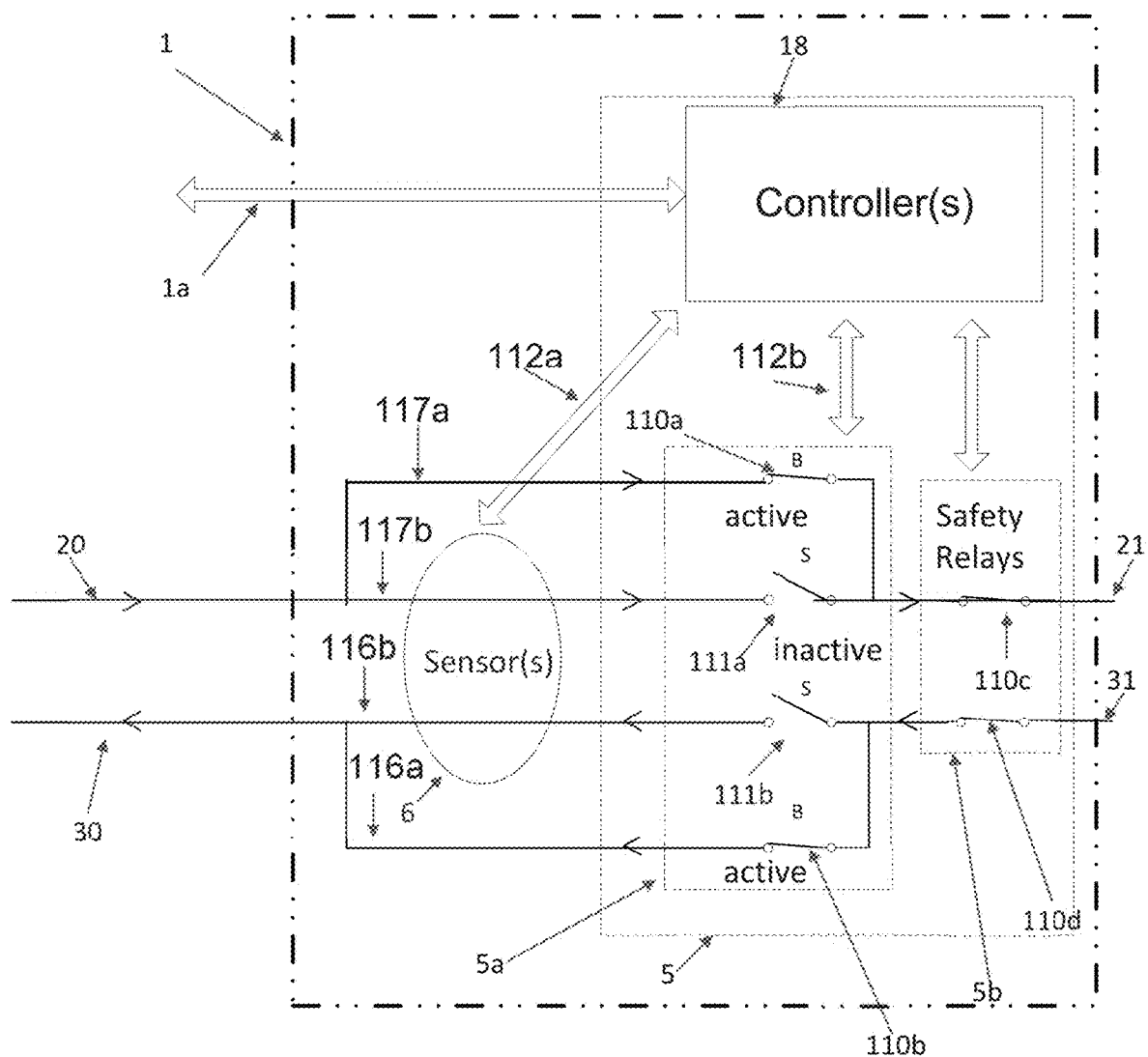

Referring to FIG. 2A, residual current device 1 may be variously configured and arranged. For example, in certain embodiments, residual current device 1 may be placed such that it measures the differential current between conductor 20 and conductor 30. In these embodiments, various current measurements at the sensor(s) may be utilized locally and/or remotely. For example, measurements may be transmitted via controller(s) 18 to one or more other devices such as devices in energy system 9, network(s)/Internet/Intranet 10 and/or end user devices such as computer 11, smart phone 12, tablet 13 and/or servers 14. In this embodiment, optional safety relays 110c may connect in series between conductor 20 and conductor 21 and between conductor 30 and conductor 31. When implemented, the safety relays 110c may be variously controlled either locally via controller(s) 18, and/or remotely by controllers located elsewhere in the energy system 9 and/or connected to the network(s)/Internet/intranet 10 such as servers 14 and/or smart phone 12. The safety relays may be opened in the event of a fault and/or where other anomalous condition(s) are detected. Controller(s) 18 may be variously configured, but in some embodiments may issue commands to, for example, safety relays 110c either via a direct link or a wireless connection and may activate the relays 110c (e.g., cause them to open) in response to a certain condition (e.g., a nonzero differential current sensed by sensor(s) 6). In some embodiments, the communication between sensor 6 and controller(s) 18, and between controller(s) 18 and safety relays 110c may be carried out over wires. In alternative embodiments, the communication medium may be wireless, optical fiber cables and/or other suitable communication mechanisms. The communication may comprise a command, status information, or a command and status information. The user and/or system operator may be given various options for dealing with various conditions. A service call may be initiated and/or the system may be placed in a safety mode pending the service call. Additionally, messages such as e-mail, SMS messages, Snapchat™, alerts, and/or other messages may be sent to various entities such as service personnel, home security systems, installers, safety personnel, power company employees, home owners, televisions, and/or other family members to warn of the anomalous condition and/or provide one or more recommended courses of action.

Referring to FIG. 2A, one embodiment of residual current device 1 may comprise a current divider circuit and/or disconnect circuit 5 and sensor(s) 6. In this example, the current divider and/or disconnect circuit 5 may be configured to include a current divider implemented by, for example, four switches (e.g., MOSFETs) 110a, 110b, 111a, and 111b which may enable conductors 20 and 21, and conductors 30 and 31, to bypass the sensor(s) 6. In this embodiment, conductor 20 may be coupled to two conductor paths, 117a and 117b, wherein 117b may run through the sensor(s) 6 and may include sampling switch 111a. Paths 117a and 117b may be coupled at the other side of the sensor to conductor 21. Conductor 31 may be coupled to two separate paths, 116a and 116b, where 116b may run through the sensor(s) 6 and may include sampling switch 111b. Paths 116a and 116b may be coupled at the first side of the sensor to conductor 30. Bypass switch 110a may be part of path 117a, and bypass switch 110b may be part of path 116a. Controller(s) 18 may switch bypass and sampling switches 110a, 111a, 110b, and 111b via one or more communication path(s) 112b. Sensor(s) 6 may transmit various sensed information such as current measurements, voltage measurements, resistance measurements, capacitive discharge measurements, and/or other measured parameters to controller(s) 18 via communication path(s) 112a. In an alternative embodiment, the controller(s) 18 might not process the sampled data. In this alternative embodiment, the data may be transmitted to other devices in the energy system 9, to computer devices 11, smart phones 12, tablets 13, servers 14, and/or other network(s)/Internet/intranet(s) 10. In an embodiment, transmitted data may include a device identifier, for example, an identification name, number or tag associated with residual current device 1 and/or an electrical device (e.g. a solar inverter) comprising residual current device 1.

Described below is one exemplary operation of the current divider circuit and/or disconnect 5 of the embodiment shown in FIG. 2A. Bypass switches 110a and 110b may be kept "normally ON" by a switching mechanism and/or device (e.g. controller(s) 18), and sampling switches 111a and 111b may be kept "normally OFF" by the same switching mechanism and/or device (e.g., controller(s) 18) and/or via a different switching mechanism and/or device. In this example, the switching may be achieved by using MOSFET transistors to implement all or some of the switches, and applying complementary signals to the gate terminals of the bypass switches 110a and 110b and sampling switches 111a and 111b. In other embodiments, other switches may be utilized, and/or other current sampling and/or current dividing techniques may be used. In this embodiment, by limiting the duration and/or cycle time of the on-off switching, the current, peak current, and/or average current being routed through the sensor, may be limited or decreased. Limiting or decreasing the current being routed through the sensor may reduce the cost, size, power dissipated by the sampling process, and/or complexity of the residual current device 1, thus allowing for more accurate and/or lower cost measurements, and/or the ability to distribute the residual current device 1 throughout the system. In this exemplary mode, current may flow through the sensor(s) via the sampling circuit using conductor paths 116b (which may include sampling switch 111b), and may flow through conductor paths 117b (which may include switch 111a).

Figure 2B:
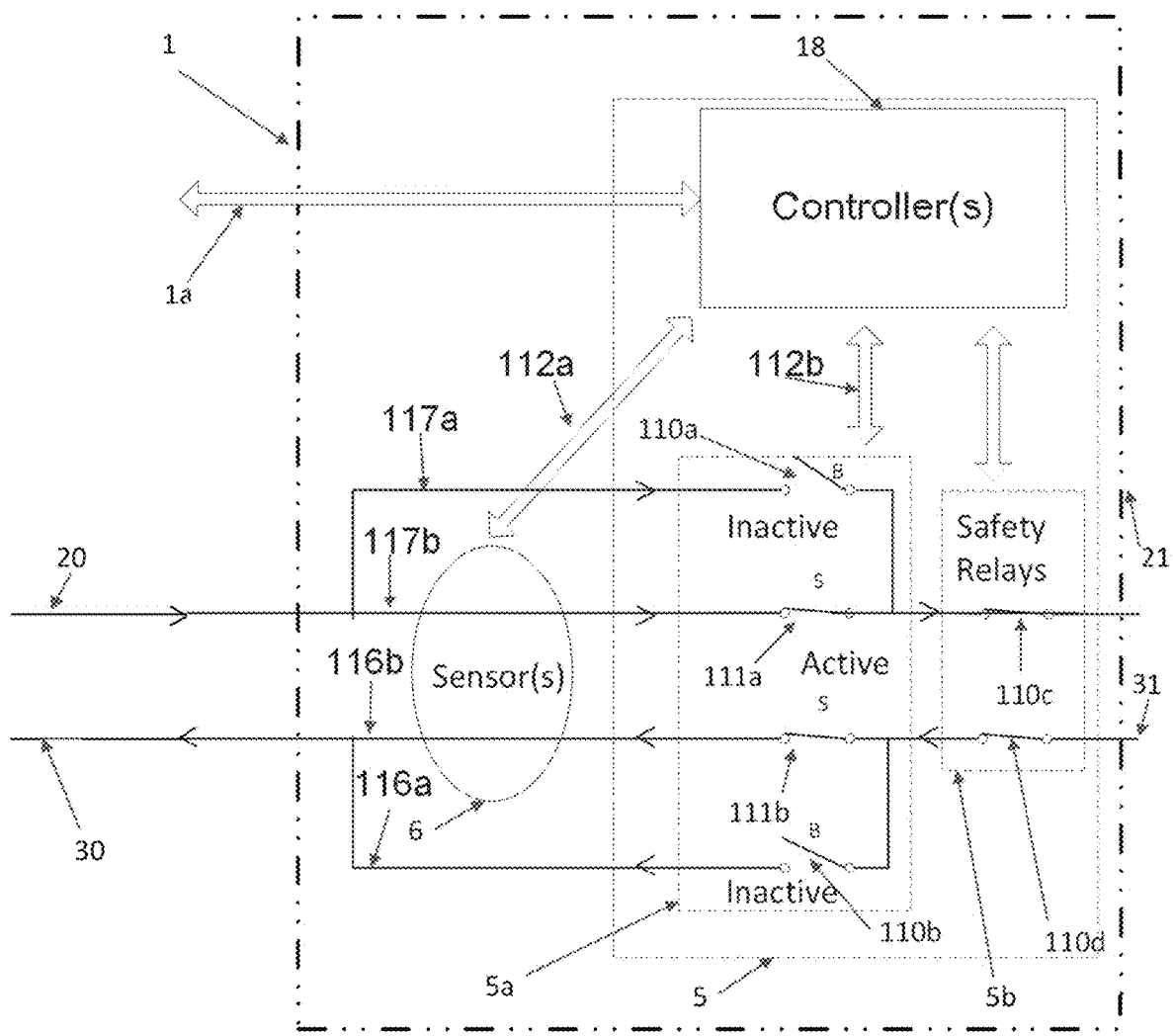

Reference is now made to FIG. 2B, which illustrates one possible residual current device 1 in a state when the sampling switches 111a and 111b are ON and the bypass switches 110a and 110b are OFF. In this state, the residual current device 1 may be active and may transmit sensed information from sensor(s) 6 such as current samples to the controller(s) 18, and/or other devices such as any device in the energy system 9, on the network(s)/Internet/intranet 10 and/or devices coupled thereto. Referring to FIG. 2B, in a different mode such as a bypass mode, conductor paths 116b and 117b, and sampling switches 111a and 111b may be bypassed via a conductor path comprising conductor 117a and switch 110a, and by a conductor path comprising conductor 116a and switch 110b. During bypass operations, the sensors 6 may or may not be active. For example, depending on the types of readings desired, the sensors 6 may or may not be active or activated during bypass operations.

By varying the duty cycle between sampling events and the duration of the samples, various advantageous results can be achieved. For example, the cost, size, and efficiency of the residual current device may be improved. For a short, temporary period of time (e.g., 10 μs or 1 μs out of a period of 1 ms or 0.1 ms, or even 0.01 ms), the signals to the bypass and sampling switches may be reversed, which may cause current to flow through paths 116b and 117b, through switches 111a and 111b, and through the sensor(s) 6. If a differential current between conductors 117b and 116b exists, this may cause sensor(s) 6 to sample a current signal which may contain high-frequency harmonics (e.g. a square-wave current signal), with a duty cycle which may be, for example, 1% or 10% or lower, at a frequency of, for example, 120 Hz, 500 Hz, 1 kHz or 10 kHz. As mentioned above, this exemplary frequency (compared with a grid frequency of, for example, 50 Hz or 60 Hz) may reduce the cost of the required sensor. Additionally, the exemplary duty cycle (e.g., a low duty cycle) may provide low power dissipation with respect to the sensor(s) 6, for example, when a resistor is part of the sensor 6 implementation, which can substantially increase the overall efficiency of the residual current device 1.

In another embodiment, the sampling switches 111a and 111b may be turned ON at various timing relationships before the bypass switches 110a and 110b are turned off (i.e. make-before-break). Make-before-break refers to a circuit with two switches and the second switch is closed before the first switch is opened. This allows the circuit to remain intact throughout the switching process. By varying the guard band between the turning on and off and/or by allowing increasing amounts of overlap, between the turning on and off of the sampling switches 111a and 111b and the bypass switches 110a and 110b, various beneficial results may be achieved. For example, by turning on the sampling switches 111a and 111b a short time before turning off the bypass switches 110a and 110b, the sensitivity related to the synchronization of the timing of control signals of the switching devices (e.g. MOSFETs) may be decreased. In this case, the current samples during the period of time when all switches are ON may be analyzed appropriately, such as being disregarded and/or treated as transient samples. In some implementations, the timing may have guard bands, substantially simultaneous switching, and/or overlapped switching on one or more conductors. Changing the timing may allow for the sensor(s) 6 to conduct other measurements, even during transient switching events, to provide additional information about the nature of any failure and/or potential failure condition.

Figure 2C:
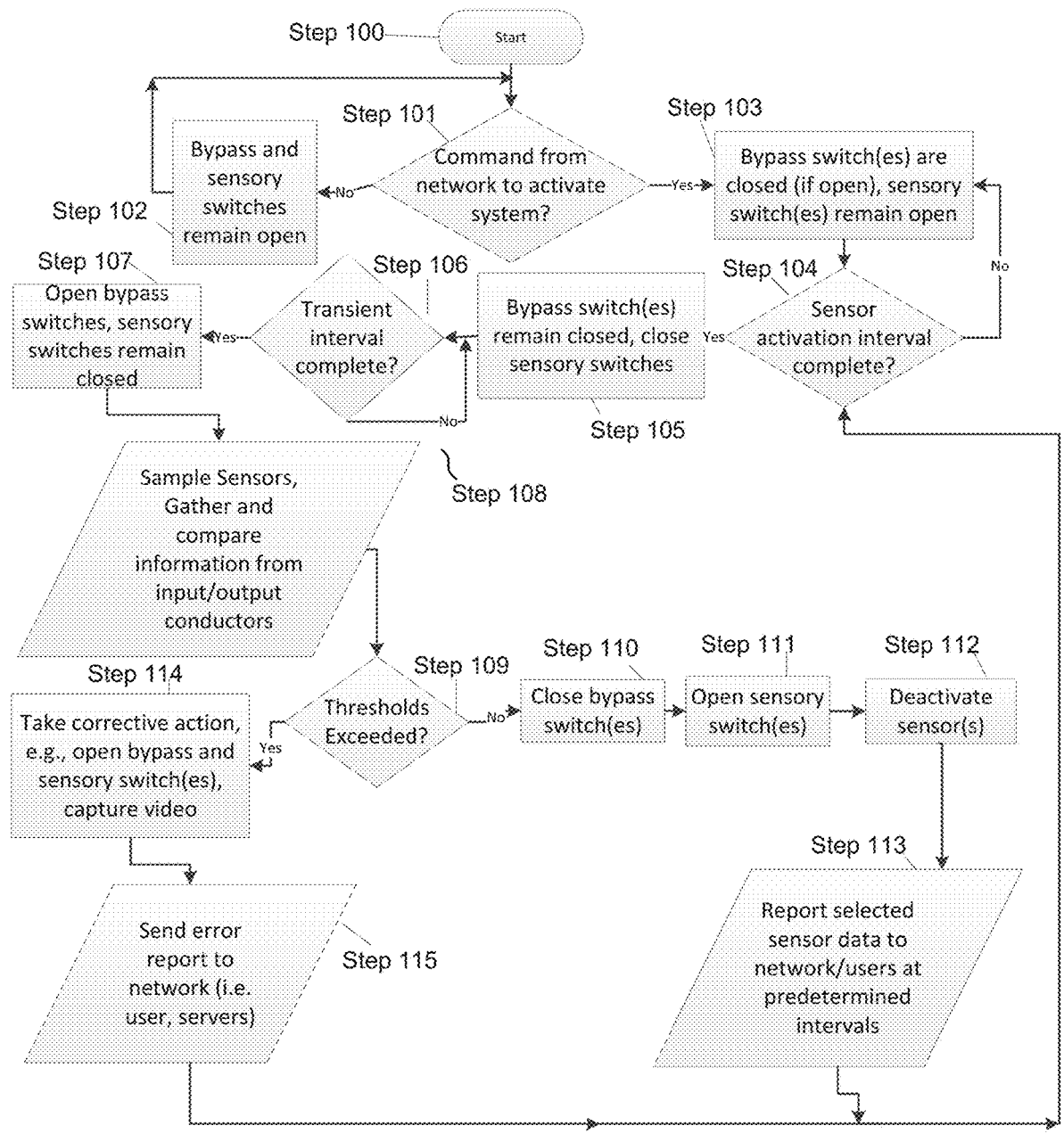
FIG. 2C is an exemplary flow diagram applicable to the embodiments shown and described herein.

Reference is now made to FIG. 2C which illustrates one example of a method or algorithm in which the controller(s) 18 interact with other portions of the protected element(s) 2, such as the residual current device 1, with other aspects of the energy system 9, and/or with the network(s)/Internet/intranet 10 and/or the devices coupled thereto such as a smart phone 12, tablet 13, computer 11, workstation 15, and/or servers 14. For example, FIG. 2C illustrates one example of an algorithm for handling fault conditions and/or the shut off of the protected element(s) 2. In this embodiment, the algorithm starts at step 100. In one implementation, at step 100, the bypass switches 110a and 110b and/or the sensory switches 111a and 111b and/or the safety relays 110c are open.

At step 101 network(s)/Internet/Intranet 10 may be used to relay a command to the controller(s) 18 in order to activate the protected element(s) 2. For example, a device connected to the network 10, such as a smart phone 12, tablet 13, computer 11, workstation 15, and/or servers 14, may transmit the command, via the network 10, to the controller. A protected element activation value may be set, at step 101, (e.g., in a non-volatile memory location) in controller(s) 18 to indicate that the activation command has been received. In this embodiment, the method continues from step 101 to step 103 when the activation command has been received once and/or until an event (e.g., a fault event) causes the protected element to disconnect (e.g., opening one or more switches due to a local and/or remote command and/or fault event) and resets the protected element activation value (e.g., in the non-volatile memory location) corresponding to disconnecting the protected element. Step 102 describes a situation where there is no command to activate the protected element(s) 2 and therefore, in this embodiment, the bypass switches 110a and 110b, as well as the sensory switches 111a and 111b, remain open. Step 103 may be entered under various conditions such as when a signal from the network(s)/Internet/intranet 10 is detected. For example, a signal may be transmitted by, a smart phone 12, tablet 13, computer 11, workstation 15, servers 14, or other connected devices to the controller(s) 18 in order to activate the system. When the signal is detected by the controller(s) 18, the bypass switches 110a and 110b may be closed, and/or the sensory switches 111a and 111b may remain open. Step 103 may also be entered during steady state operation of the system. In that case, the bypass switches 110a and 110b may already be closed, and sensory switches 111a and 111b may remain open. In this exemplary embodiment, the residual current device 1 may include sensor(s) 6 to sample various parameters such as currents from the conductor 20 and/or conductor 30. The sensor(s) 6 may be programmed to activate and/or begin gathering data at the end of a specified interval (e.g., a transient interval) and/or stays active until the data it gathers is reported to the controller(s) 18. Step 104 may determine whether the sampling time interval for collecting data by the sensor(s) 6 is complete. In other words, the residual current device 1 may operate normally in the bypass mode where the sensors are bypassed. A periodic and/or non-periodic interval transpires where the sensor is not active. Once the sampling time interval is complete, the sensor is activated to take the next sample. In this example, as the sensor is activated at step 105, the bypass switches 110a and 110b remain closed and the sensory switches 111a and 111b close. In this state with the bypass switches 110a and 110b closed and the sensory switches 111a and 111b closed, a transient event will occur which is, for example, referenced and shown in FIG. 3. At step 106, sampling is delayed until the transient event is complete. The sampling delay may be a predetermined delay and/or may be a dynamic delay determined by sensor(s) 6. For example, sensor(s) 6 may be configured to detect the transient event by taking measurements and determining when the transient event is over. Once the sensor 6 has detected that the transient event has ended, the process may move to step 107 in which the bypass switches 110a and 110b may be opened, and the sensory switches 111a and 111b may remain closed. Step 108 may be implemented where the sensor(s) 6 samples various parameters such as the current between conductor 20 and conductor 30. In Step 109, the data retrieved may be analyzed by the controller(s) 18 and, if one or more predetermined and/or dynamic thresholds are exceeded, the method may proceed to step 114. In step 114, corrective action may be taken such as disconnecting conductor 20 to isolate the protected element 2. For example, corrective action may be taken by opening the bypass switches 110a and 110b, the sensory switches 111a and 111b, and/or the safety relays 110c, 110d. Step 115 may then optionally occur in which the controller(s) 18 report various status information to various devices such as network(s)/Internet/intranet 10, smart phone 12, tablet 13, computer 11, workstation 15, and/or servers 14. If no threshold is exceeded, Steps 110 and 111 may be enabled in which the bypass switches 110a and 110b are closed and the sensory switches 111a and 111b are opened. Next, in Step 112 the sensor 6 may be deactivated, which is followed by Step 113 where the data collected by the sensor 6 may be sent to the controller(s) 18 and/or to one or more of the network(s)/Internet/intranet 10, smart phone 12, tablet 13, computer 11, workstation 15, and/or servers 14. In one exemplary embodiment, the system may return to Step 104 and determine whether the sensor interval is complete. In another embodiment, the system may return to Step 101 and determine whether a command has been received to continue or restart system activation.

After data is collected from the sensor(s) 6, decisions may be made regarding the status of the protected element(s) 2 based on the data. For example, if the sensor(s) 6 detect an insignificant anomaly, as depicted in Step 109, but the protected element(s) 2 is not deactivated since the threshold has not been passed, the controller(s) and/or other remote devices and/or users/installers can decide to disengage the respective protected element(s) 2 via smart phone 12, tablet 13, computer 11, workstation 15, and/or servers 14. The user/installer can also opt to reengage the protected element(s) 2 if they believe that it is safe for use. For example, the protected element(s) 2 may be reengaged via a suitable override, which may be engaged using an access code. The method described in FIG. 2C may allow for safe and rapid disengagement of a hazardous protected element(s) 2, and/or degraded operation, with one or more of the protected elements 2 isolated from the remainder of the system.

Figure 3:
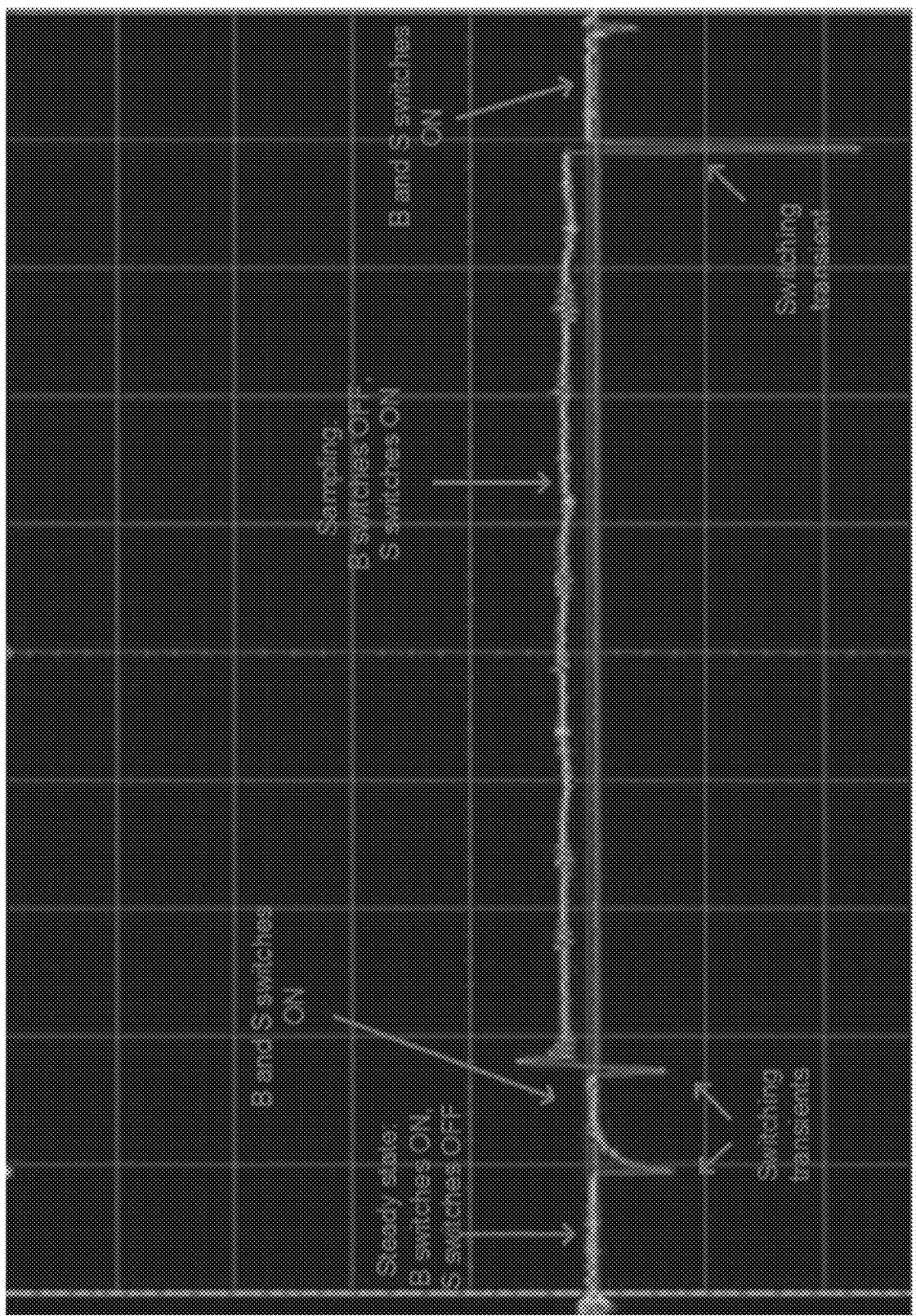
FIG. 3 is a screen shot of exemplary waveforms in accordance with some aspects of certain embodiments.

Reference is now made to FIG. 3. In this exemplary embodiment, a circuit analyzer output is shown with exemplary results of an operation of the exemplary circuits shown in FIGS. 2A and 2B, and in particular a signal associated with the sensor device (6) (in this example, a current sensor) when a differential current is present between the conductor 117 and the conductor 116. The switching methodology was carried out as described above, where sampling switches 111a and 111b are turned ON before the bypass switches 110a and 110b are turned off. The transient events are visible in the illustrated output, as is the measurement of 20 mV during the period of time when the bypass switches 110a and 110b are OFF and the sampling switches 111a and 111b are ON.

Referring back now to FIGS. 2A and 2B, safety relays 110c and/or 110d may optionally be included to provide circuit disconnects for isolating the protected element(s) 2 from other portions of the system. For example, if the controller(s) 18 detect a potentially problematic condition, the safety relays 110c and/or 110d may be activated. The safety relay 110c may be coupled to conductor 20 and/or conductor 21, The safety relay 110d may be coupled to conductor 30 and/or conductor 31, In one embodiment, safety relay 110c is coupled to conductor 20, and safety relay 110d is coupled to conductor 30. In this embodiment, the user/installer can deactivate the protected element 2 remotely by sending command to the controller 18 to open the safety relays 110c and/or 110d. If the safety relays 110c and/or 110d are not functioning correctly and do not open, the switches 110a, 110b, 111a, and 111b may still be opened to prevent damage to the protected element 2. In a separate embodiment where the safety relays 110c and 110d are coupled to conductors 21 and 31, respectively, the safety relays 110c and/or 110d act as secondary safety measures in case the switches 110a, 110b, 111a, and 111b do not open. In certain embodiments, the safety relays may not be needed in that the controller(s) 18 can simply open switches 110a, 111a, 111b, and 110b to disconnect the protected element(s) 2 from the rest of the system, thus avoiding the added cost of the safety relays and reducing the switching components by two. In these circumstances, it may be desirable to have switches 110a, 110b, 111a, and 111b configured as normally open. In this manner, if there is a power failure or controller failure, the protected element(s) 2 will be disconnected from the remainder of the energy system 9.

The controller(s) 18 may be variously configured. In one implementation, the controller 18 may contain inverted clock circuits connected to various sensors and switches as described herein. In more sophisticated embodiments, they may comprise one or more controllers. For example, one or more controller(s) 18 may configure the sensors 6, sample the sensors 6, and interpret data from the sensors 6. In one embodiment, the sensors 6 may be current sensors. In other embodiments, the sensors 6 may be multi-meter sensors. Additionally, one or more controllers may operate the current divider circuit, for example, by switching switches 5a (e.g., switches 110a, 110b, 111a, 111b) at appropriate timing intervals as discussed herein. Further, one or more controller(s) 18 may operate one or more switches 5b which may act as, for example, safety relays 110c and 110d. Additionally, the controller(s) may communicate with other parts of the protected element(s) 2 such as PV cell(s)/arrays 70, inverter (e.g., micro inverter(s) 16, optimizer 17), fault circuit (e.g., fault detection/fault indicator circuits) 7, fault reporting circuit(s) 8, energy system components 9 (e.g., interconnected disconnect(s), PV cells/arrays, inverters, micro inverters, optimizers, residual current devices, meters, breaker(s), AC main(s), junction boxes), network(s)/Internet/intranet 10, computers 11, smart phones 12, tablets 13, and/or servers 14. One or more controllers and/or one or more software communication stacks operating within a controller (e.g., a TCP/IP stack) may handle communications with other connected devices.

We now describe another embodiment where the user and/or service provider is notified of an event impeding the effectiveness of a protected element(s) 2 by the controller(s) 18. In this embodiment, the energy system and/or protected element(s) 2 may include one or more environmental sensors such as camera(s) 19, temperature sensors, rain sensors, and/or other environmental sensor devices. Where one or more camera(s) 19 are utilized, they may be positioned such that they have a field of view that may include one or more PV cell(s)/array(s) 70. Where one or more camera(s) 19 are utilized, the cameras or other environmental sensors may be disposed on the roof of a residence, e.g., overlooking the protected element(s) 2 and/or on the PV cell(s)/array(s) and with a field of view encompassing the PV cell(s)/array(s). The camera(s) 19 may be coupled to the controller(s) 18 as depicted in FIG. 1. The camera(s) 19 may be programmed to record a video either continuously and/or during a specified event such as a suspected shading event, a suspected fault event, and/or at predetermined and/or requested times enabled by a user, installer, and/or service provider. The video and/or pictures may be sent and stored in a database 15a, via the network(s)/Internet/intranet 10, until a predetermined amount of time and/or it is overwritten by a subsequent video and/or picture. In one implementation, the camera 19 may record a video whenever an anomaly is detected via the sensor(s) 6 within the residual current device 1. For example, when the sensor(s) 6 detects an anomaly and reports it to the controller(s) 18, a command from the controller(s) 18 may be sent to the camera 19 to record a video and/or a picture. In this example, when the sensor(s) 6 detect the anomaly, the controller(s) 18 may transmit a command to the environmental sensors to record various environmental conditions related to the event. Certain transient events may occur only where there is a severe rain storm, only where there is high humidity, only where the temperature exceeds 102 degrees, and/or only where the wind is above 40 mph. The controller 18 may record weather data obtained from the network(s)/Internet/intranet 10 and/or from a home security system. The user, installer, and/or system operator may have also have access to these videos part of the normal diagnostic tools and/or as part of an artificial intelligence system configured to analyze the data.

The devices described herein may be used, for instance, to protect an equipment installer from liability for accidents.

For example, by using the devices described herein, injuries may be prevented in certain situations, such as when a home owner uses a ladder that cuts through wiring and results in an anomaly. Further, an installer may be better equipped to troubleshoot a condition when presented with additional information concerning environmental conditions at the time of the fault. For example, if a tree falls on a house, an artificial intelligence system could automatically detect this condition and shut down power, thereby allowing emergency personnel to respond and handle the situation. Further, the environmental conditions could be shared with home security systems, and/or sent to various devices such as mobile device 12, tablet 13, and/or computer 11 via the network(s)/Internet/intranet 10. Another scenario where a camera 19 may be useful is one in which various protected element(s) 2 are shaded by trees or a neighboring structure. For example, if a neighbor built an addition on their house that shades one or more cells 70, this information could be useful in troubleshooting issues detected by controller(s) 18 and/or one or more remote systems such as servers 14. Shade covering the photovoltaic cells 70 may decrease their efficiency or production. If the user, installers and/or service providers know which protected element(s) 2 are shaded, they may be able to take action in order to remove the shading, such as trimming a tree, moving the protected element(s) 2, and/or adding additional protected elements. With this information, the user and/or service provider is aware of the environmental conditions impacting the protected element(s) 2 and can take the appropriate measures to mitigate the problem and increase its effectiveness.

In one implementation, the camera 19 may be monitored to detect that an item is obstructing an element of a solar array. For example, data from the camera 19 may be analyzed to automatically report that a tree branch has fallen on an element of a solar array.

In another embodiment, the controller(s) 18 may assess weather data and utilize the network(s)/Internet/intranet 10 to warn the user and service provider about potential weather events that are likely to impact the protected element(s) 2. The network 10 may receive weather updates via the databases 15a and/or a computer 11, and forward the updates to the user. Using this information, the user may preemptively shut the protected element(s) 2 via their computer 11, smart phone 12, and/or tablet 13. For example, where the camera(s) 19 detect lightning events, the protected elements may be temporarily shut down and/or disconnected from the remainder of the power grid.

In one implementation, the protected element(s) 2 may be shut down automatically, without any input from the user or service provider. For example, an algorithm may be implemented in the controller(s) 18 which correlates weather events to the frequency of anomalies within the protected element(s) 2. By utilizing this correlation, predictions can be made as to the probability that a weather event will cause damage to the protected element(s) 2. In response to this prediction, the controller 18 may preemptively deactivate the protected element(s) 2. For example, the algorithm may determine a risk to the protected elements 2. In this example, the algorithm may then compare the determined risk to a preset, or predetermined, threshold risk, and automatically shut down the protected elements 2 if the determined risk is greater than the preset threshold risk.

The algorithm configured to shut down the protected elements 2 may begin by categorizing each type of weather event, and assigning a threshold value to each type of weather event. The assigned threshold value must then be surpassed in order for the protected element(s) 2 to be automatically shut down. For example, a thunderstorm may be initially assigned a first correlative value. Each time the weather service reports a thunderstorm and/or the environmental sensor(s) detects a thunderstorm in the area, and an anomaly occurs within at least one of the protected element(s) 2 at said residence, the controller(s) 18 may learn that preemptive action is necessary during that environmental event. Therefore, each subsequent environmental event of that magnitude (e.g., tornado), will cause the protected element(s) 2 to shut down. Further, future thunderstorms and/or environmental events of a lower magnitude that do not affect the protected element(s) 2 will cause the threshold associated with deactivating the protected element to be adjusted until an appropriate threshold is determined. Over time, each type of weather occurrence combined with its respective correlative value can be used to predict what type of weather is most likely to cause a disruption in the protected element(s) 2. Data on weather events and their damage assessments can be used to improve the response in the protected element(s) 2 and its related devices over time. Furthermore, after a specific amount of time such as a year or six months, each weather event's threshold can be reevaluated and their respective correlative values reset based on the gathered data. In one implementation, data may be gathered for one household or system and the algorithm may be "taught" based on the data corresponding to the one household or system. In another implementation, data may be gathered from a plurality of households or systems, and the algorithm may be "taught" based on the data corresponding to the plurality of households or systems. For example, an algorithm, or portions of the algorithm, such as variables or parameters, may be generated for a specific location based on data gathered from surrounding locations.

Weather conditions such as lightning or ice storms can cause unique problems. If lightning or storms have been predicted by the weather service, and a transient event takes place when the camera 19 detects lightning or storms, data describing the transient event and weather conditions may be sent to the user and service provider. Additional diagnostic scans may then be performed, based on detecting the transient event or weather condition, on each protected element(s) 2 via their respective sensors 6 to assess for damage from the lightning strike or storm. This exemplary embodiment may warn the user and service provider of dangerous weather events, and may also shut down the protected element(s) 2 and/or conduct appropriate diagnosis after an environmental event. For example, the protected element(s) 2 may be shut down automatically, without any additional user input The various devices coupled to the protected element(s) 2 (e.g., servers 14) may analyze the collected data in real time and/or over a period of time, and report back any detected anomalies. Further, the servers 14 may monitor the system in relation to the characteristic performance of other systems, such as systems located in a similar geographic area, and locate and/or predict various circuit problems.

The current divider circuit and/or disconnect 5 may be variously configured. Where the current divider and/or disconnect 5 include switches, the switches may be any suitable switch. For example, the switches may include mechanical switches and/or electronic switches. MOSFET switches may be advantageous in certain applications. While certain MOSFET switches may be used with voltages above 500 V and switching frequencies above several hundred kHz, these switches may be more expensive. In other embodiments, where the voltages being switched are less than about 500 V and the switching frequencies are under about several hundred kHz, MOSFET switches may be more cost effective. In certain embodiments, such as the embodiment shown in FIG. 2A, each complimentary pair of switches (e.g. 110*a* and 111*a*, 110*b* and 111*b*) may be switched using a make-before-break switching scheme, which may result in very low voltage stress on the switches. In these embodiments, such as those described above and those used to produce the signal shown in FIG. 3, significant savings may be realized when selecting appropriate switches. Where the MOSFET switch is integrated into a semiconductor device, the MOSFET switch may be implemented as a number of MOSFET switches spread over various locations on the semiconductor device. For example, the MOSFET switches may be separated to better distribute heat. Other switches are also applicable in various applications such as insulated-gate bipolar transistor (IGBT) switches, bipolar junction transistor (BJT) switches, and/or other active switches such as thyristor circuits (e.g., gate turn-off thyristor and/or MOS-controlled thyristor). The switches themselves may be variously configured such as, for example, single pole single throw (SPST), single pole double throw (SPDT), double pole, double throw (DPDT), double pole, single throw and/or other matrix switching arrangements. The switches may also include one or more active elements such as diodes (e.g., Schottky diodes) and/or other circuit elements. Typical factors that may be considered when selecting a switch for an application include, among others: breakdown voltage, on resistance, switching frequency, switching latency, leakage, stray inductances, device capacities, heat dissipation, packages, transition times, ringing, and/or switching loss factors.

Figure 4A:
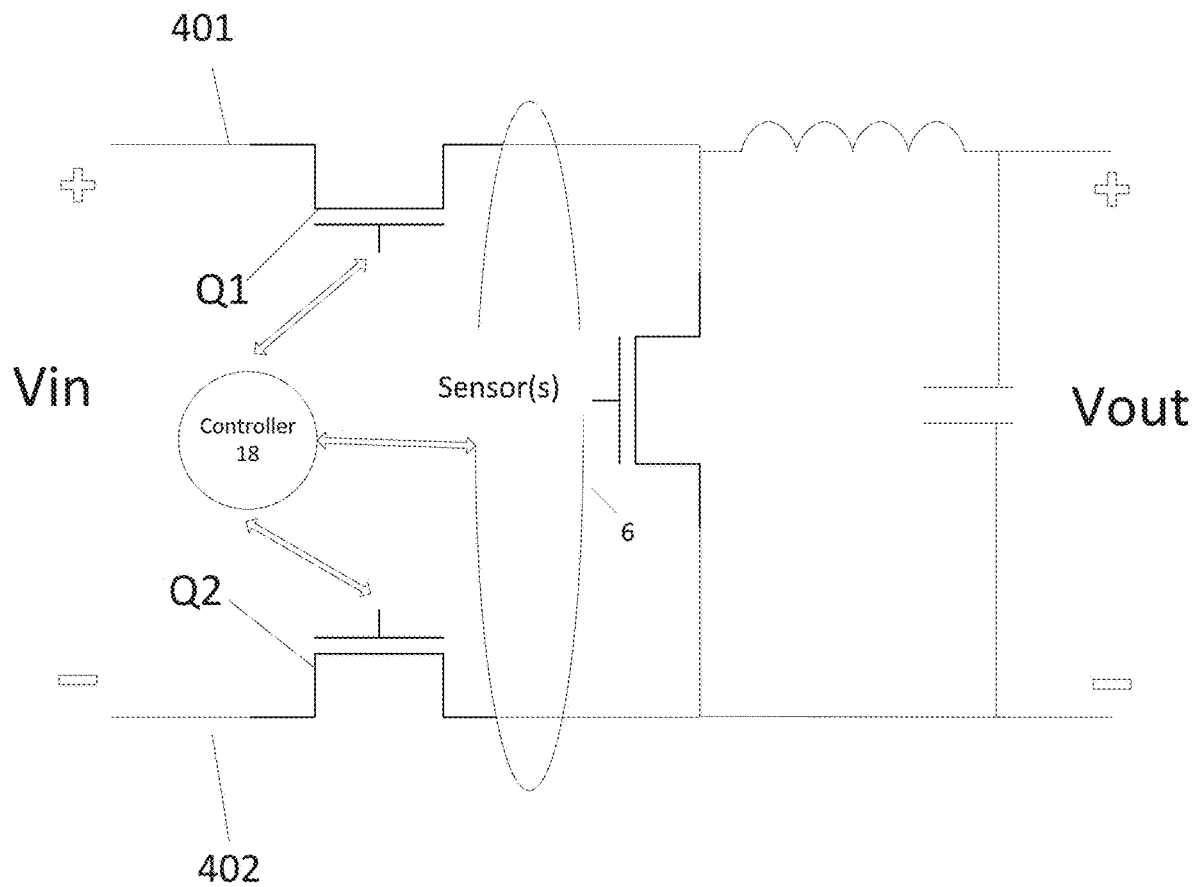
FIGS. 4A, 4B, and 5-7 are part schematic, part block diagrams of exemplary embodiments.

Referring now to FIG. 4A, in certain instances it may be desirable to share components within the protected element 2. For example, in the embodiment illustrated in FIG. 4A, an optimizer 17 may include a step-down DC to DC converter. Conductor 401 may be coupled to the DC input power, and conductor 402 may be coupled to the input ground. Switch (e.g. MOSFET) Q1 may be switched at an appropriate frequency (e.g. 10 kHz) and duty cycle (e.g. 50%) to regulate the output DC voltage. Q2 might not be strictly necessary for DC-DC conversion functionality. By including Q2 in series with conductor 402 and switching it in tandem with Q1 (i.e. switches Q1 and Q2 are ON at the same time and OFF at the same time), the voltage stress on Q1 may be reduced, which may decrease costs. Furthermore, since the current flowing through conductors 401 and 402 may contain high-frequency harmonics, sensor 6 may be coupled to conductors 401 and 402 and may sense certain high-frequency portions of differential current between the conductors. Sensor(s) 6 may be coupled to the controller(s) 18 and may monitor various conditions (e.g., those conditions associated with the optimizer) as discussed herein.

Figure 4B:
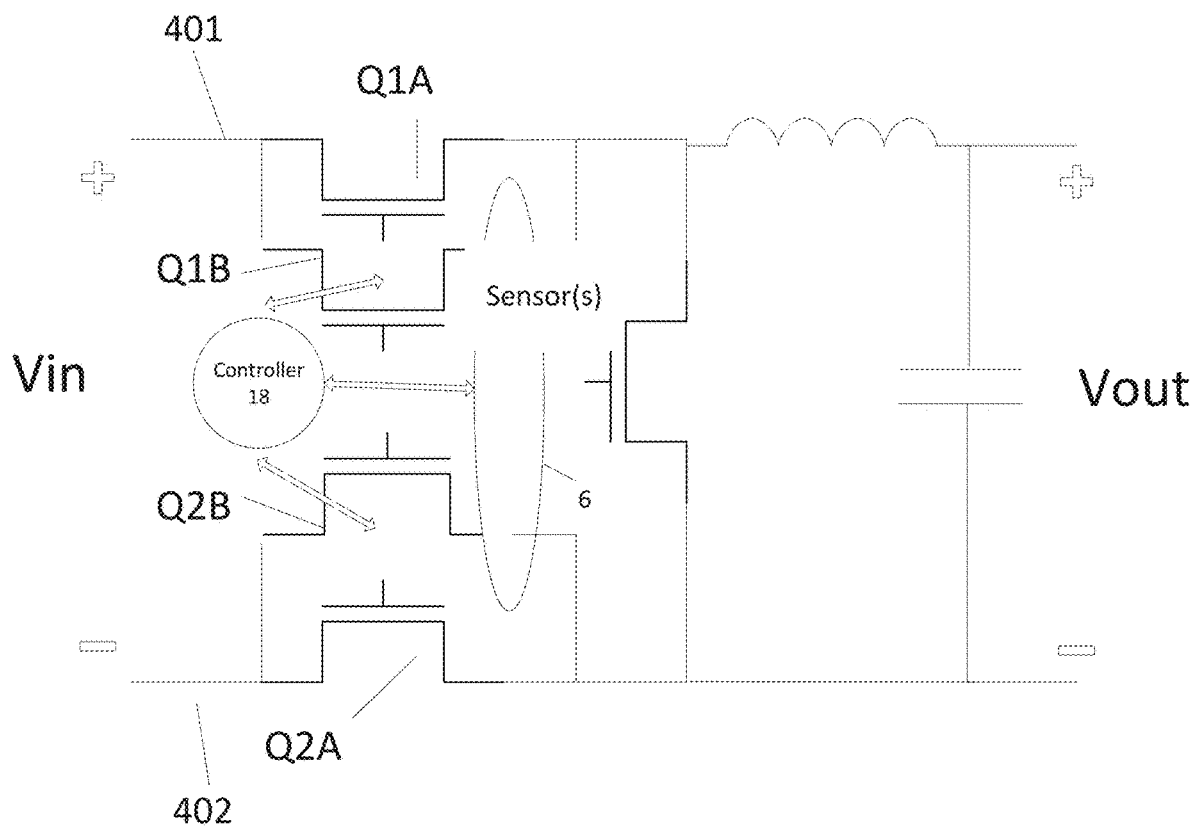

Reference is now made to FIG. 4B, which shows yet another exemplary embodiment of sharing certain components within the protected element 2. In this embodiment, an optimizer 17 includes a step-down DC to DC converter. Conductor 401 may be coupled to the DC input power, and conductor 402 may be coupled to the input ground. Switches (e.g. MOSFETs) Q1A and Q2A may be switched at an appropriate frequency (e.g. 10 kHz) and duty cycle (e.g. 0.5) to regulate the output DC voltage. Q2A may not be strictly necessary for DC-DC conversion functionality. By including Q2A in series with conductor 402 and switching it in tandem with Q1A (i.e. switches Q1A and Q2A are ON at the same time and OFF at the same time), the voltage stress on Q1A may be reduced, which may decrease costs. By further including switch Q1B in parallel with Q1A and including Q2B in parallel with Q2A and switching them in an appropriate manner as described herein, a small portion of the current flowing through conductors 401 and 402 may be temporarily diverted to flow through sensor 6, which may sense certain high-frequency portions of differential current between the conductors. Sensor(s) 6 may be coupled to the controller(s) 18 which may monitor various conditions (e.g., those conditions associated with the optimizer) as discussed herein. Sensor 6 may be enabled for current sensing at only specific times, such as when switches Q1B and Q2B are ON.

Figure 5:
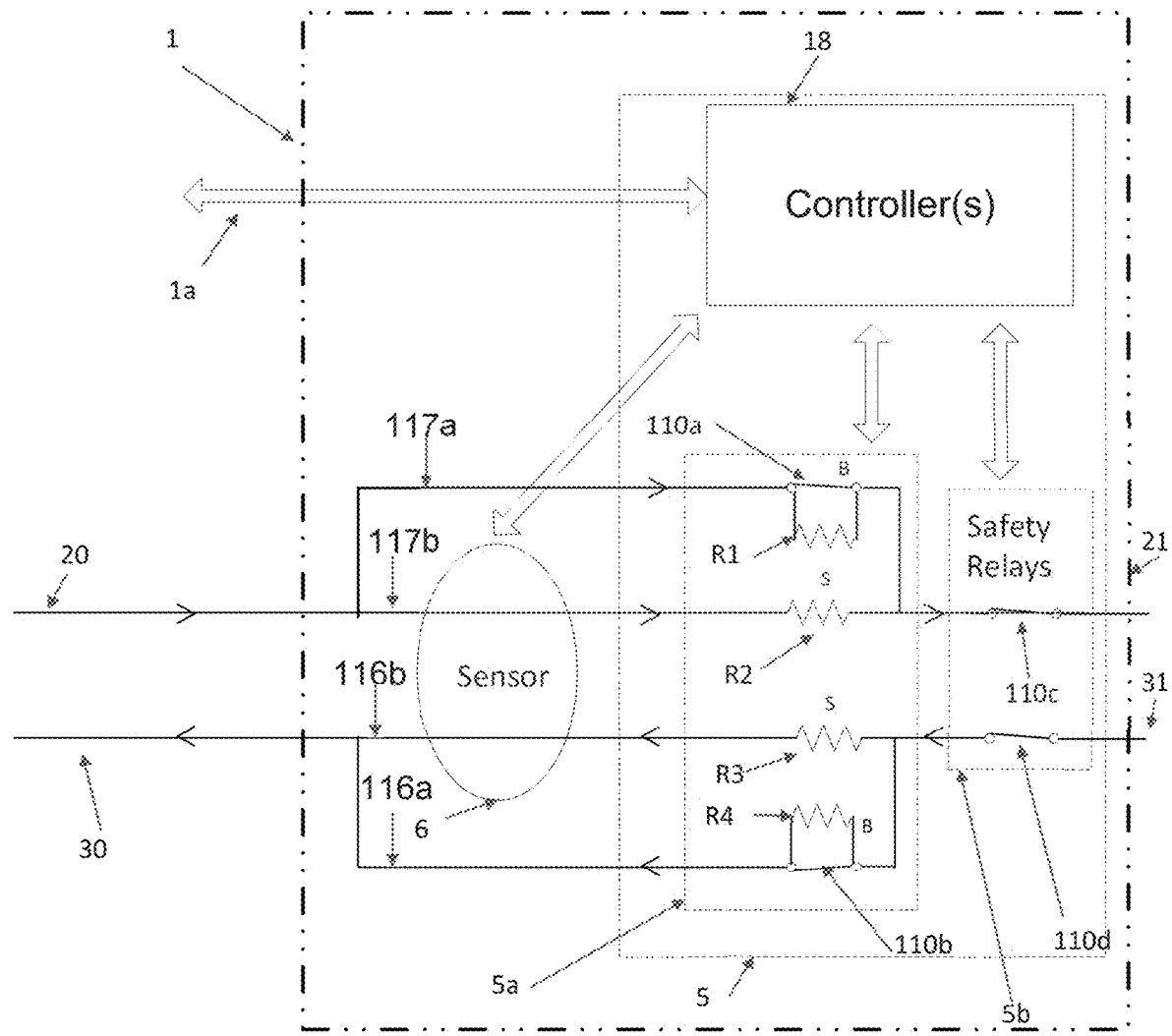

Reference is now made to FIG. 5, which shows an embodiment of a residual current device 1 that may be configured to comprise, for example, current divider circuit and/or disconnect circuit 5 and sensor(s) 6. In this example, the current divider and/or disconnect circuit 5 may be configured to include a current divider implemented by, for example, two switches (e.g., MOSFETs) 110*a* and 110*b* which may enable conductors 20 and 21 and conductors 30 and 31 to bypass the sensor(s) 6. In this embodiment, conductor 20 may be coupled to two conductor paths, 117*a* and 117*b*, wherein 117*b* may run through the sensor(s) 6 and may include resistor R2. Paths 117*a* and 117*b* may be coupled at the second side of the sensor to conductor 21. Conductor 31 may be coupled to two paths; 116*a* and 116*b*, wherein 116*b* may run through the sensor(s) 6 and may include resistor R3. Paths 116*a* and 116*b* may be coupled at the first side of the sensor to conductor 30. Bypass switch 110*a* may be part of path 117*a*, and resistor R1 may be coupled in parallel to switch 110*a*. Bypass switch 110*b* may be part of path 116*a*, and resistor R4 may be coupled in parallel to switch 110*b*. Controller(s) 18 may switch bypass switches 110*a* and 110*b* via one or more communication path(s). The resistors R1 and R2 operate as a current divider circuit when the bypass switch 110*a* is open, thereby limiting the current passing through sensor 6. This configuration, in which the resistors R1 and R2 operate as the current divider circuit, may reduce the cost of sensor 6, and may also allow sensor 6 to be reduced in size so as to allow for the sensor 6 to be integrated onto an integrated circuit and be used in power operations such as photovoltaic power array operations. Similarly, resistors R3 and R4 operate as a current divider circuit when the bypass switch 110*b* is open, thereby limiting the current passing through sensor 6. This configuration may reduce the cost and size of sensor 6. This configuration may also allow sensor 6 to be reduced in size so as to allow integration onto an integrated circuit while used in power operations such as photovoltaic power array operations.

In one example, the resistors R1 and R4 in FIG. 5 may have a resistance of approximately 1 mΩ, 10 mΩ, or 100 mΩ. In another example, resistors R2 and R3 may have a resistance of 0.001Ω, 0.01Ω, 0.1Ω, 1Ω or 10Ω. When switches 110*a* and 110*b* are ON or closed, current may bypass paths 116*b* and 117*b* since these paths are of high impedance compared to paths 116*a* and 117*a*, and current may bypass sensor 6 via the low-impedance paths 117*a* and 116*a*. When switches 110*a* and 110*b* are OFF or open, bypass paths 116*a* and 117*a* may be of low impedance compared to paths 116*b* and 117*b* (e.g. by a factor of 10, 100, or even 1000 or more), and current flowing through paths 117*b* and 116*b* may be a divided current of relatively low amplitude and hence the sensor may be reduced in size. In the event of a differential AC or DC current between conductors 117*b* and 116*b*, sensor 6 may detect components of said differential current, some of which may be high-frequency components. The duty cycle and frequency of the switching may be similar to the duty cycle and frequency utilized in other embodiments.

Figure 6:
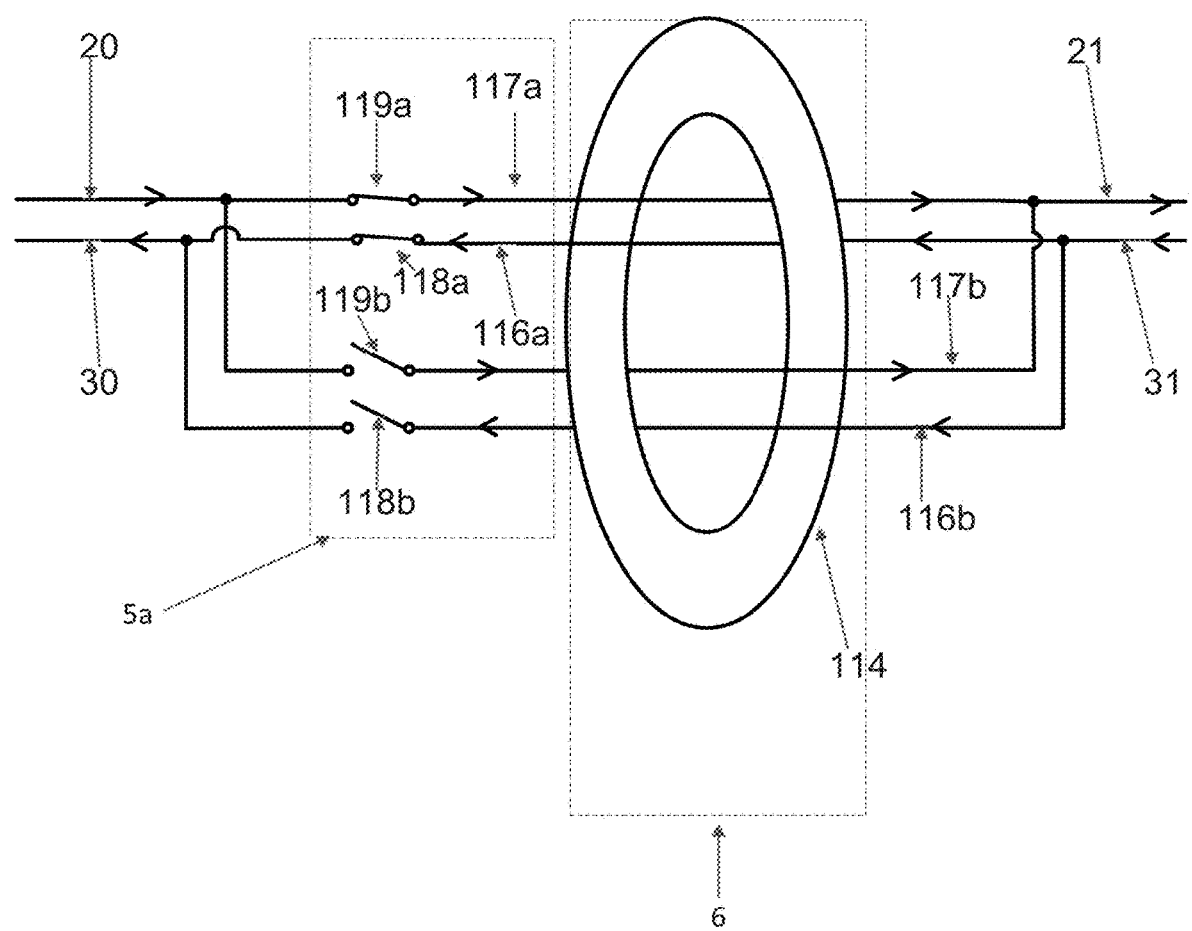

Referring to FIG. 6, the various currents may be diverted from one path to another by staggered operation of switches 5a, e.g. MOSFETs. Current flowing in conductor 20, 21 may be routed through path 117a when switch 119a is ON, or closed, and switch 119b is OFF. Current flowing in conductor 30, 31 may be routed through path 116a when switch 118a is ON, or closed, and switch 118b is OFF, or open. Similarly, current flowing in conductor 20, 21 may be routed through path 117b when switch 119b is ON, or closed, and switch 119a is OFF, or open. Similarly, current flowing in conductor 30, 31 may be routed through path 116b when switch 118b is ON, or closed, and switch 118a is OFF, or open. Sensor(s) 6 may be implemented in any suitable manner such as by using a device comprising a transformer, core, secondary windings, and a resistor. Switches 118a and 119a may be switched such that they are ON at the same time, and OFF at the same time. Switches 118b and 119b may be switched such that they are ON at the same time, for example when 118a and 119a are OFF, and OFF at the same time, for example when 118a and 119a are ON. The switching may be carried out using a "make before break" methodology, which may cause the voltage stress on the switches to be very low and may reduce the cost of selecting appropriate switches. If switching is carried out as described above, when switches 118a and 119a are switched from ON to OFF and switches 118b and 119b are switched from OFF to ON (with or without make before break), and in the event of a differential AC or DC current between conductor 20 and conductor 30, the polarity of said differential current may change from positive to negative, or vice versa. In this case, the polarity of the magnetic flux flowing through the sensor(s) 6 (e.g., through a magnetic core of a current sensor) may also change, and the sensor may detect components of said differential current, some of which may be high-frequency components. The staggered switching may be at an appropriate frequency, such as 120 Hz, 1 kHz or 10 kHz, and at any duty cycle.

Figure 7:
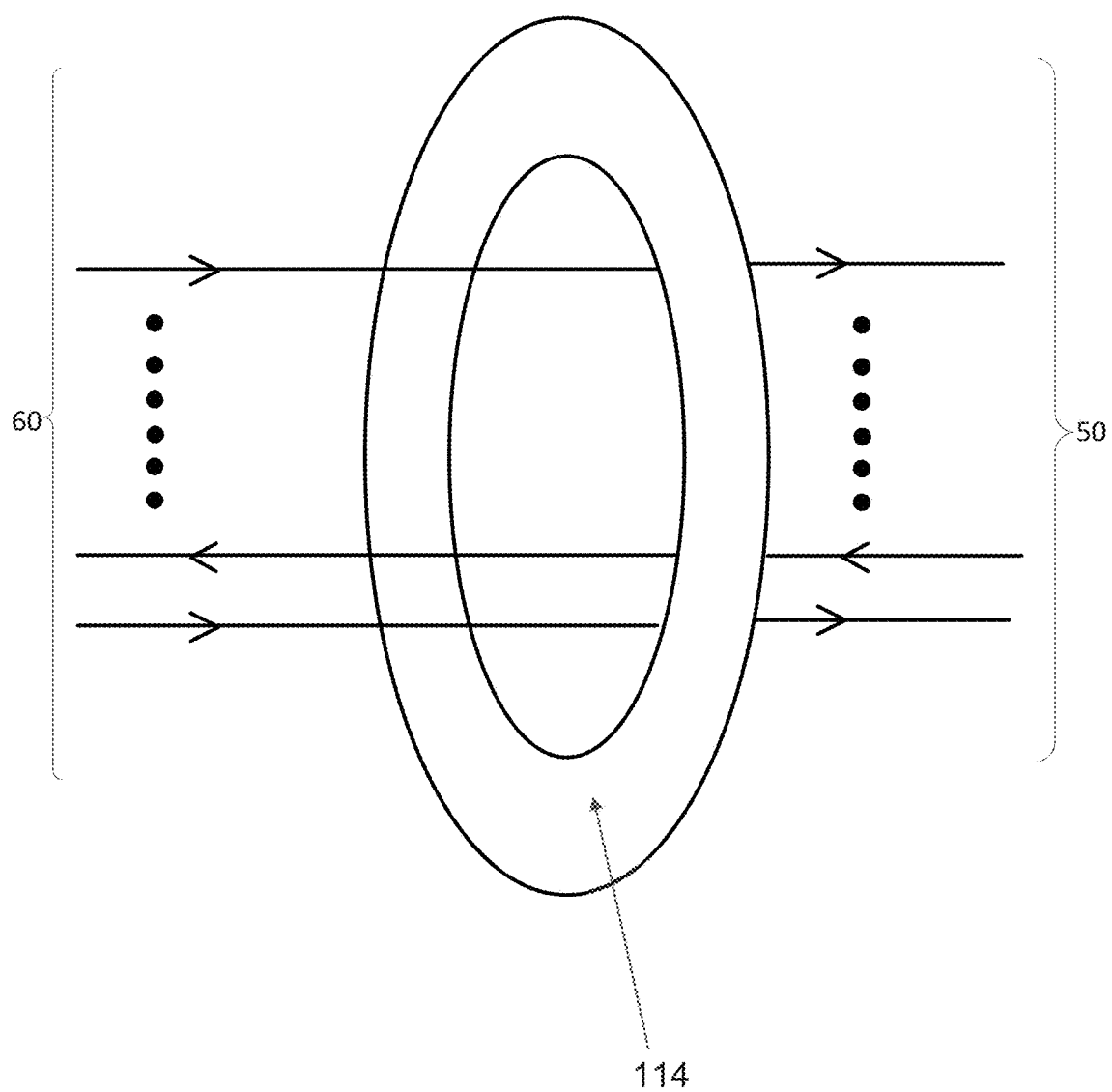

Reference is now made to FIG. 7, which shows an embodiment in which a residual current device 1 device may be used to detect differential current between a plurality of conductors. Under normal operation conditions, the currents flowing in the plurality of conductors may sum to zero, and a sum current of more or less than zero may indicate a differential current. In one embodiment, the three carrier conductors of a three-phase AC system pass through a sensor(s) 6, such as a magnetic current device 114. In another embodiment, two conductors of a single-phase AC or DC system may pass through magnetic current device 114. In yet another embodiment, more than three conductors belonging to a higher-order multiphase system can pass through current device 114. In these embodiments, current device 114 may detect a situation in which the sum of all currents passing through current device 114 is not zero or approximately zero. Similarly to previous embodiments described herein, each conductor may be coupled to two paths, one bypassing the current device 114 and one running through the current device 114. The routing of the current from one path to another may be controlled by a plurality of switches (e.g. MOSFETs) as described herein. For example, in the four-conductor configuration shown in FIG. 6, when sampling switches 118b, 119b are ON and bypass switches 118a, 119a are OFF, the current in all paths is routed through the current device 114, and a differential current may be detected. When sampling switches 118b, 119b are OFF and bypass switches 118a, 119a are ON, the currents bypass the current device and differential current might not be detected. Additional conductors and switches may be added, and the current sensor may be configured to sense a differential current if the sum of currents in all the conductors does not sum to zero.

The residual current device 1 in accordance with embodiments herein may be integrated onto an integrated circuit. For example, the sensor(s) 6 may be formed directly on the integrated circuit and any inductive current sensors 6a, 6b may be formed as coils oriented horizontally and/or vertically within structures in the integrated circuit. Additionally, conductor 20 and conductor 30 may be configured to pass through the current sensors 6a, 6b within the integrated circuit and/or adjacent to the integrated circuit. Further, the current divider circuit and/or disconnect 5 (e.g., MOSFETs) may be disposed in the integrated circuit. Where the current divider circuit and/or disconnect 5 is composed of MOSFET switches, the MOSFET switches may be comprised of a plurality of MOSFET transistors dispersed along the plane of the integrated circuit for power dissipation.

Figure 8:
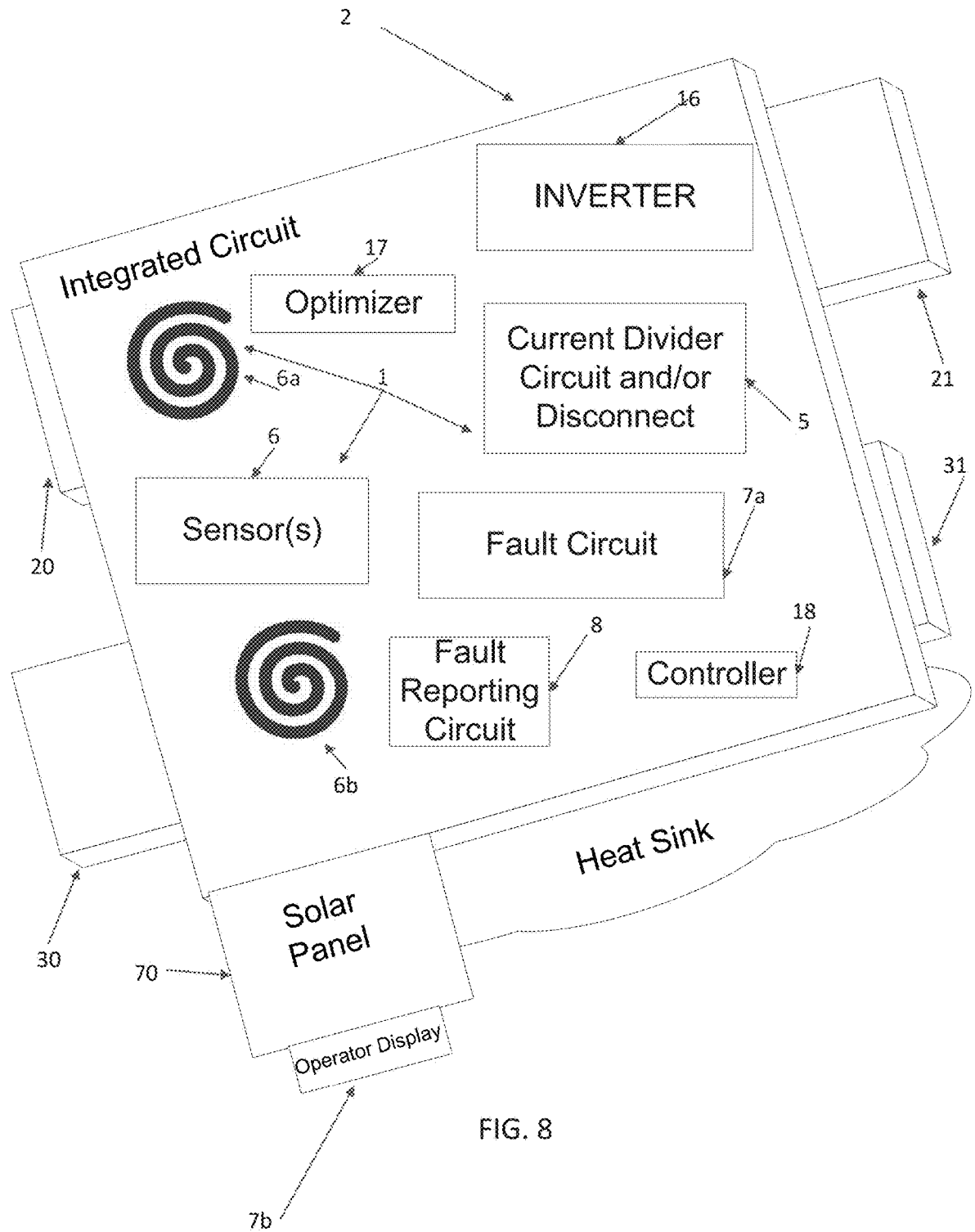
FIG. 8 is a part schematic, part block diagram of an integrated circuit which comprises embodiments described herein.

Referring to FIG. 8 the protected element(s) 2 may optionally include one or more other components other than a residual current device 1. For example, the integrated circuit of FIG. 8 may optionally include an optimizer circuit such as a DC to DC converter which may or may not include maximum power point tracking and/or a boost and/or buck converter. Additionally, the integrated circuit may include an inverter 16 such as a micro inverter. Further, the integrated circuit may optionally include other components of the protected element(s) 2. Further, the integrated circuit may be mounted on or within a photovoltaic cell(s)/array 70 and use the housing of the array as a heat sink. Further, an operator display 7b may be included as part of the protected element(s) 2 which allows for internal settings, power control, fault warnings, reporting, device setup, and control. For example, the photovoltaic cell(s)/array (e.g., solar panel) 70 may be configurable such that it can act as a residual current device, optimizer, and/or inverter. In this manner, the installation of the solar panel may be simplified so that an installer can simply plug the solar panel into a bus running between the solar panels. Alternatively, the solar panels can be directly plugged into each other, which may serve as the power bus and thus save time and cabling costs. In one implementation, the solar panels can serve as their own bus, optimizer, inverter, RCD and controller, communicating among themselves and with other energy system components.

Figure 9:
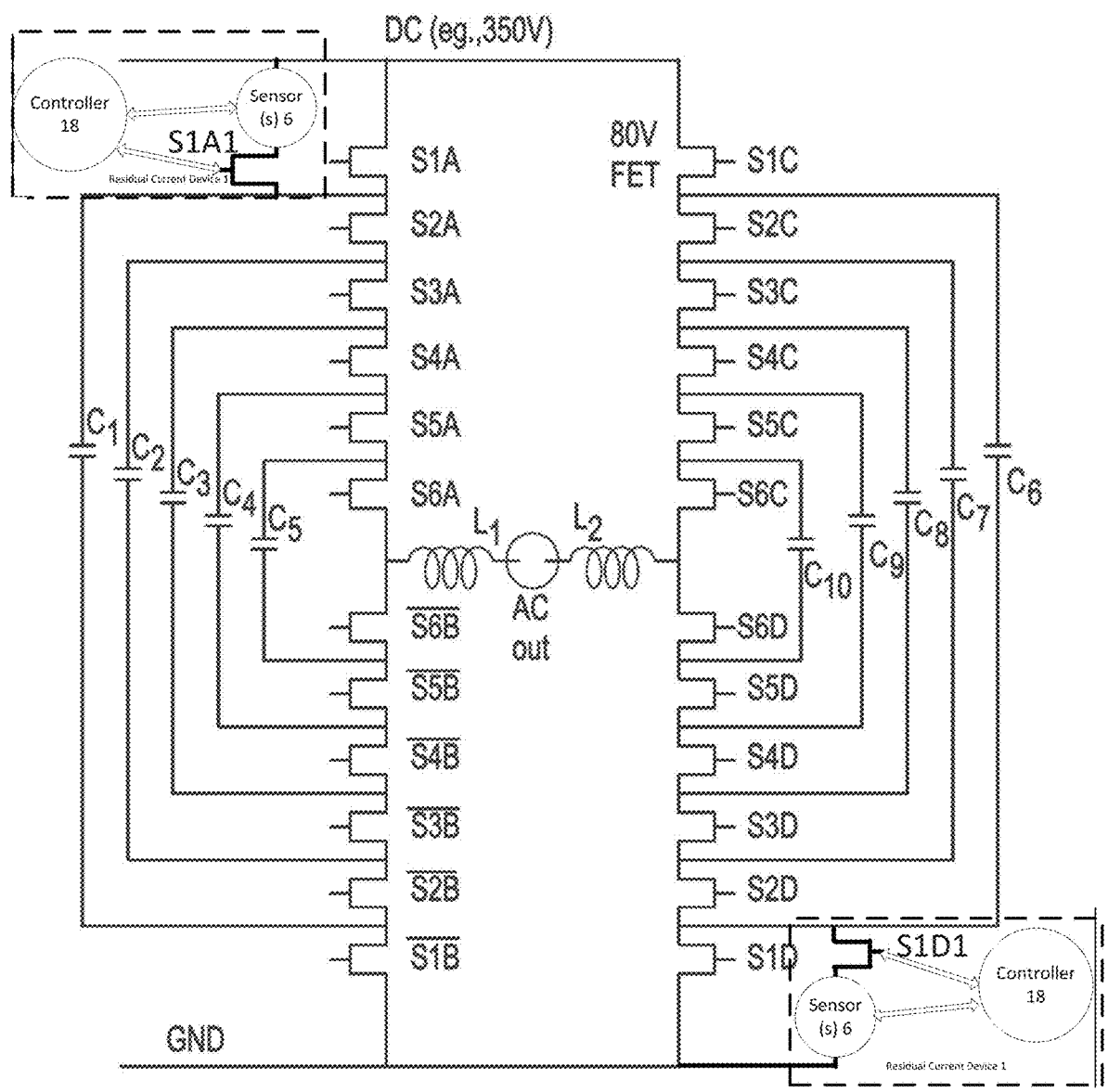
FIGS. 9 and 12 are part schematic, part block diagram of another exemplary embodiment.

Reference is now made to FIG. 9, which shows another exemplary embodiment of sharing certain components within the protected element 2. Switches disposed within the inverter 16 and/or optimizer 17 may be shared with switches disposed within the current divider circuit and/or disconnect 5. For example, the bypass switch may be a switch (e.g., a MOSFET switch) within the inverter 16 and/or optimizer 17. In one exemplary embodiment, FIG. 9 refers to inverter circuits, such as those shown in U.S. patent application Ser. No. 14/485,682, entitled "Multi-level Inverter," filed on Sep. 13, 2014, which is hereby incorporated by reference in its entirety (hereinafter Multi-level Inverter Application). FIG. 9 is an illustration of one or more switches, such as the switches in the embodiments shown in the Multi-level Inverter application (e.g., switch S1B, S1A, S1C, and/or S1D), that may be connected in parallel with one or more switches from the residual current device 1 (e.g., sensor switches 111a, 111b FIG. 2A and/or S1A1, S1D1 FIG. 9) and thus the residual current device 1 may share one or more switches with the inverter(s) 16 as depicted in FIG. 9. FIG. 9 shows an exemplary application of the residual current device 1 used in an inverter 16. A first switch S1A1 of the residual current device 1 can be placed in between the incoming DC power and the inverter at switch S1A1. A second switch S1D1 of the residual current device 1 can be placed between the ground wire and the inverter at switch S1D1. Each of the switches may have the same or different sensor(s) 6 (e.g., a current sensor) disposed in series with the sensor switches S1A1 and/or S1D1. The placement of sensor switches S1A1 and/or S1D1 related to the residual current device(s) 1 may be such that the bypass switches S1D and/or S1A are part of the inverter. Thus, the residual current device(s) can save the cost of the switches (e.g., MOSFET switches used for bypass which may already be present in the inverter). In this and in similar embodiments, the original ON time of the inverter switches S1A and S1D may be split between the switches S1A and S1A1, and S1D and S1DA. For instance, if the inverter voltage control logic requires that switch S1A be ON for 0.1 ms, when coupled with the protected element 2 the switch S1A may be ON for 0.09 ms, and the switch S1A1 may be ON for 0.01 ms. In this manner, the effective conduction time of the path containing S1A and S1A1 is 0.1 ms, as required by the inverter logic, and the current sensor(s) 6 may sample current during the 0.01 ms window. The two switches S1A and S1A1 may also be ON simultaneously for a short period of time (make before break), in which case each switch would be ON for a correspondingly longer period of time. Sensor(s) 6 coupled to the controller(s) 18 monitor various conditions (e.g., those conditions associated with the inverter) as discussed herein. As stated in previous embodiments, each residual current device 1 may include one or multiple controller(s) 18. These controller(s) could then report the data gathered via the sensor(s) 6 to various devices on the network(s)/Internet/intranet 10.

Figure 10:
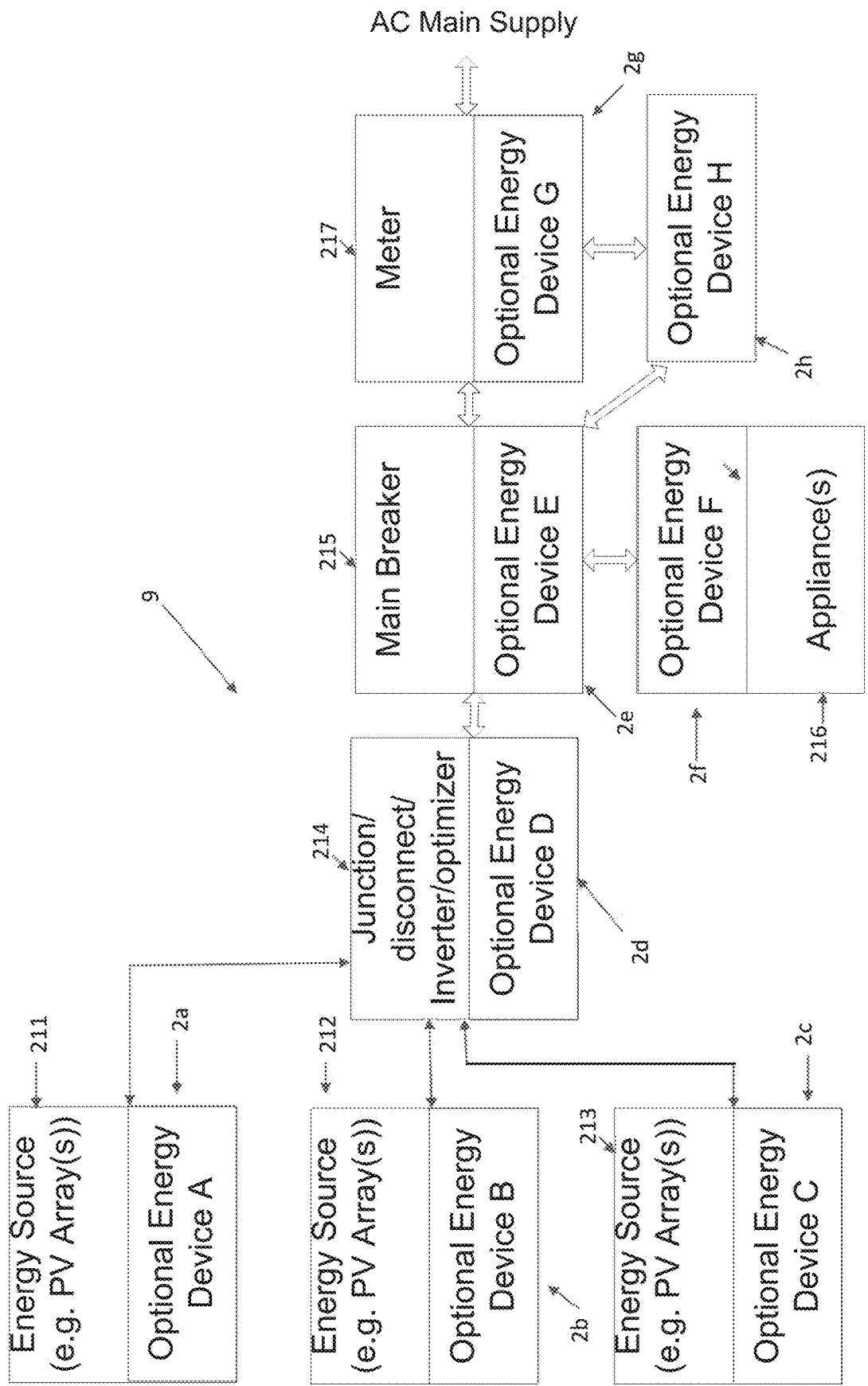
FIG. 10 is a part schematic, part block diagram of a system having various components, one or more of which may comprise embodiments described herein.

Referring to FIG. 10, by integrating the residual current device 1, inverter 16, and/or optimizer on a single semiconductor, substantial cost savings may be achieved and the protected element(s) 2 circuitry may be distributed throughout the power system. For example, the protected element(s) 2 circuitry (e.g., integrated circuit) may form part of an optional energy device 2a-2h which may be integrated into PV arrays 211, 212, 213, into junction(s), disconnect(s), inverter(s) and/or optimizer(s) 214, into main breakers 215, into appliances 216, meters 217, and/or positioned as stand-alone devices 2h. By integrating the residual current devices 1 and miniaturizing them as described herein, it becomes practical to distribute them throughout the energy system 9—thus substantially improving overall safety, reducing maintenance, and allowing degraded safe operations even after a partial system failure. Thus, the central monitoring station, installer, energy system, and/or home owner can take corrective action to isolate the faulty system and still maintain operational capabilities.

Figure 11:
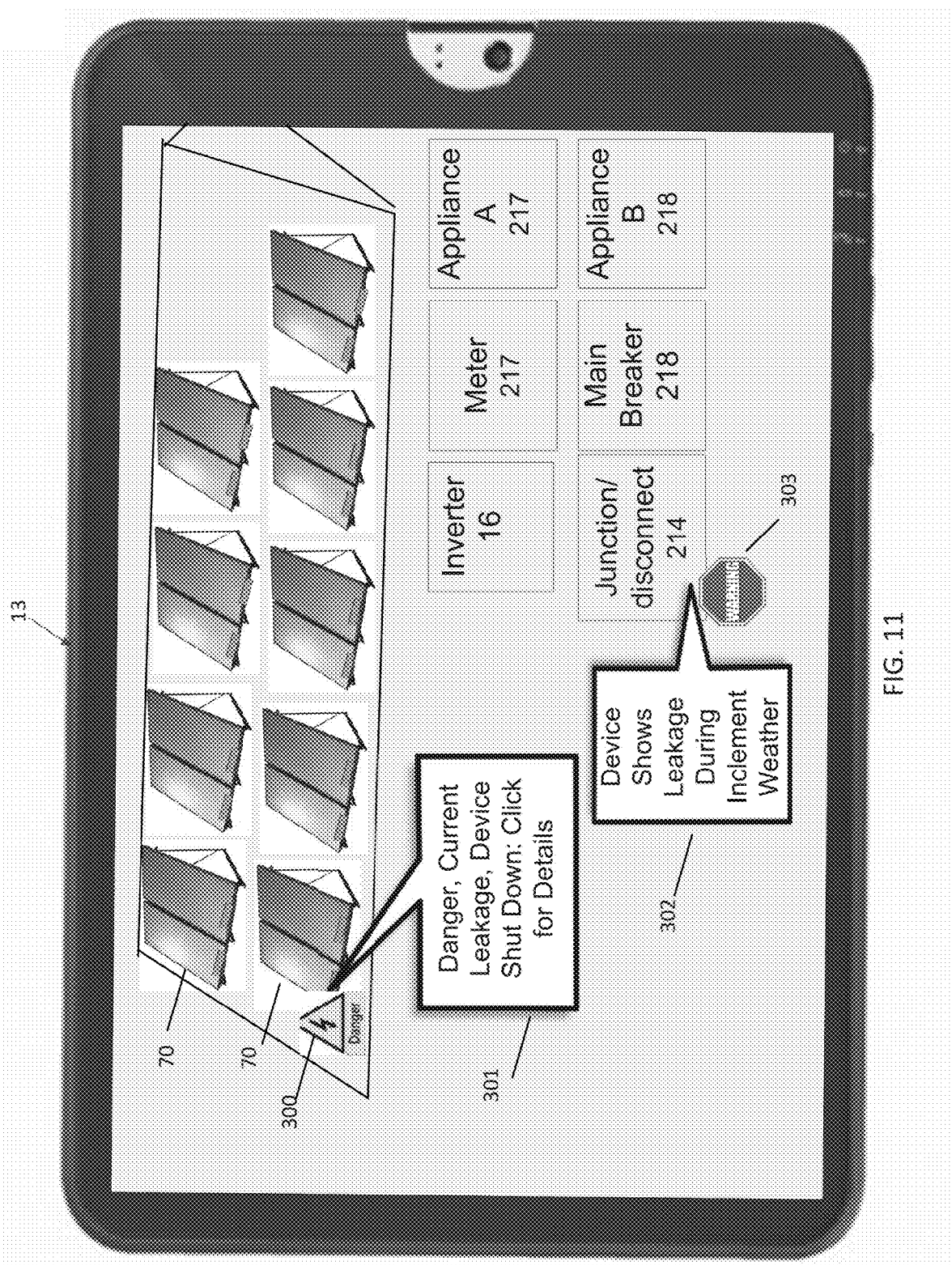
FIG. 11 illustrates an exemplary user interface for use with embodiments described herein.

Referring to FIG. 11, an exemplary application running on a smart phone 12, tablet 13, computer 11, workstation 15, and/or servers 14 is shown. The application may provide location awareness and troubleshooting on the position of the potential fault within the energy system. For example, the physical layout of the photovoltaic system may be shown on the application relative to its mounting position on and/or within the home. The controller(s) 18 can detect the location of the potential fault, the type of potential fault, and whether or not that fault is constant or intermittent. The controller(s) 18 may indicate that immediate action was taken (e.g., device isolated from the system) and/or that the operator has some control over the next actions. For example, the homeowner may schedule maintenance, and/or the operator may be notified to reach out to the homeowner to alert him of needed maintenance. The safety monitoring and corrective action could be sold to the homeowner as an additional service. If a safety condition arises, e.g., a tree falls on the owner's home, corrective action can be taken automatically by the energy system and the relevant parties notified of how to proceed. Additionally, the homeowner can be notified that impacted systems have been shut down. Further, conditions such as capacitive leakage which are not yet critical can be detected and corrective action can be taken before these conditions become critical.

Figure 12:
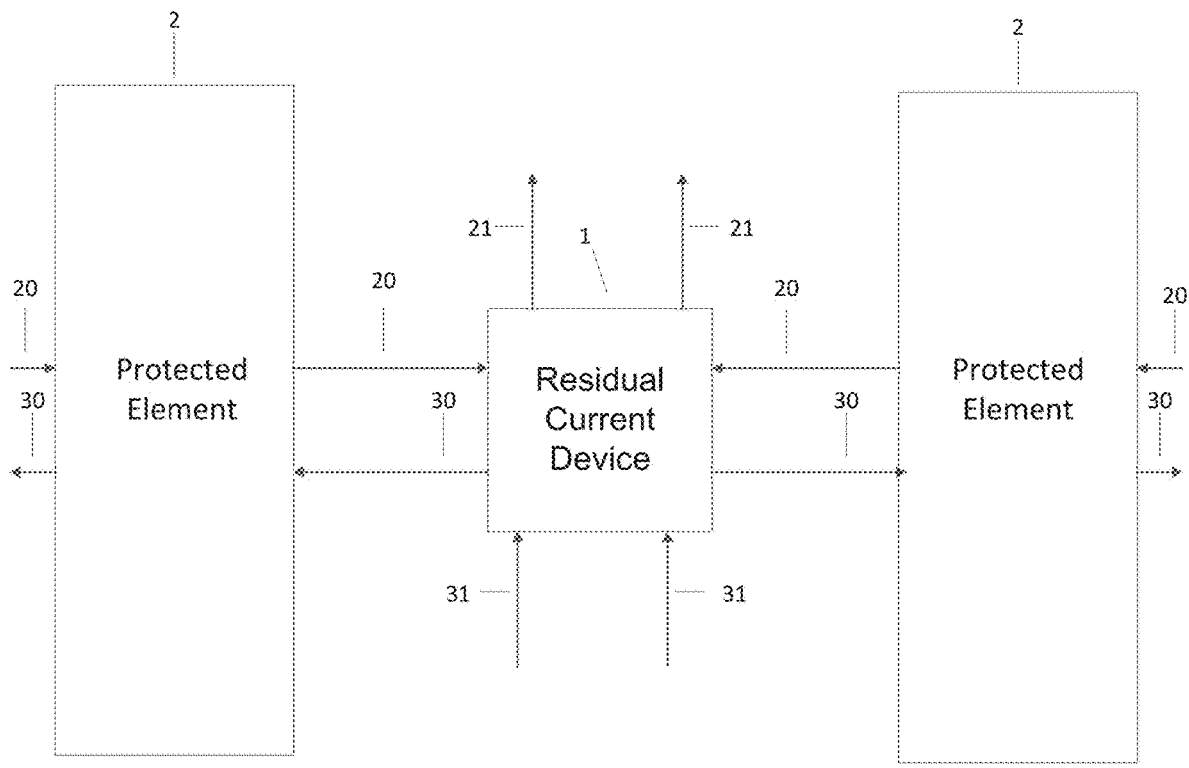

FIG. 12 illustrates an exemplary embodiment in which a residual current device monitors multiple protected elements 2. The illustrated residual current device 1 comprises one sensor 6 per protected element 2, although other configurations may be used. By placing the residual current device 1 outside of the protected element 2, and allowing the current to pass through the residual current device 1, multiple protected elements 2 may be connected to one residual current device 1. The controller 18 located within the residual current device 1 may communicate with each of the sensors 6 at pre-determined time intervals. At the set time, the specified sensor 6 may be activated to monitor the corresponding protected element 2. The data gathered by the sensor 6 may then be transmitted to the controller 18 for processing. The illustrated embodiment in FIG. 12 may allow for efficient monitoring of multiple protected elements 2, and may also be capable of shutting down multiple protected elements 2. For example, the protected elements 2 may be shut down simultaneously or at different times. In one implementation, if the controller 18 detects an anomaly in one protected element 2 via the sensor 6, a user may be given the option to deactivate the single protected element 2, specific protected elements 2 connected to the shared residual current device 1, or all of the protected elements 2 connected to the shared residual current device 1.

It is noted that various connections are set forth between elements herein. These connections are described in general and, unless specified otherwise, may be direct or indirect; this specification is not intended to be limiting in this respect. Further, although elements herein are described in terms of either hardware or software, they may be implemented in either hardware and/or software. Additionally, elements of one embodiment may be combined with elements from other embodiments in appropriate combinations or subcombinations. For example, the sensors and current path altering elements of one embodiment may be interchanged with the sensors and current path alternating element of other embodiments.

What is claimed is:
1. A method comprising:
switching a current between flowing through a first conductive path and flowing through a second conductive path, wherein the second conductive path comprises a current sensor, wherein the switching comprises:
switching the current from flowing through the first conductive path to flowing through the second conductive path;
while the current is flowing through the second conductive path, and using the current sensor, determining if a differential current exists between the current and another current flowing through a third conductive path; and
switching, based on determining that the differential current is below a threshold amount of differential current, the current from flowing through the second conductive path to flowing through the first conductive path.

2. The method of claim 1, wherein the switching comprises switching the current using at least one pair of complementary single-pole-single-throw switches, or using at least one single-pole-double-throw switch.

3. The method of claim 1, wherein the switching comprises switching the current using a plurality of Metal Oxide Semiconductor Field Effect Transistors.

4. The method of claim 1, wherein the switching comprises switching the current at a frequency of 100 Hz or higher.

5. The method of claim 1, wherein the current sensor comprises one or more current transformers.

6. The method of claim 1, wherein the switching the current from flowing through the first conductive path to flowing through the second conductive path comprises closing a second switch prior to opening a first switch.

7. The method of claim 1, wherein determining if the differential current exists comprises transmitting data to a remote device, the data being indicative of the differential current.

8. The method of claim 7, wherein transmitting the data to the remote device comprises transmitting one or both of a current measurement or a device identifier.

9. The method of claim 1, further comprising opening one or more safety switches after determining that the differential current exists.

10. The method of claim 1, wherein the determining if the differential current exists comprises detecting a high-frequency current component.

11. A method comprising:
    detecting a differential current resulting from switching at least one current to alternately flow through two different conductive paths of a residual current device,
    wherein the switching comprises switching a switch in parallel to a first resistor, and
    wherein the switching the switch comprises shunting at least a portion of the at least one current to a second resistor to limit the at least one current flowing through the residual current device.

12. The method of claim 11, wherein one of the two different conductive paths comprises a low-impedance bypass of a sensor.

13. The method of claim 11, wherein the switch comprises a Metal Oxide Semiconductor Field Effect Transistor.

14. An apparatus comprising:
    a first conductive path comprising a first switch,
    a second conductive path comprising a second switch,
    a third conductive path comprising a third switch,
    a fourth conductive path comprising a fourth switch,
    a controller configured to:
        control the first switch and the third switch to switch first current between flowing through the first conductive path and flowing through the third conductive path; and
        control the second switch and the fourth switch to switch second current between flowing through the second conductive path and flowing through the fourth conductive path; and
    a current sensor, wherein the first conductive path and the second conductive path bypass the current sensor and the third conductive path and the fourth conductive path are routed through the current sensor, and wherein the current sensor is configured to detect a differential current between the third conductive path and the fourth conductive path,
    wherein:
        the apparatus is configured to be connected to an electrical grid that provides alternating-current power at a grid frequency; and
        the controller is configured to control the first switch and the third switch to switch the first current, and to control the second switch and the fourth switch to switch the second current, both at a frequency higher than the grid frequency.

15. The apparatus of claim 14, wherein the first switch, the second switch, the third switch and the fourth switch are implemented using a plurality of Metal Oxide Semiconductor Field Effect Transistors.

16. The apparatus of claim 14, wherein the current sensor comprises a current transformer.

17. The apparatus of claim 14, wherein the current sensor is configured to detect high-frequency current.

18. An apparatus comprising:
    a first conductive path comprising a first switch,
    a second conductive path comprising a second switch,
    a third conductive path comprising a third switch,
    a fourth conductive path comprising a fourth switch,
    a controller configured to:
        control the first switch and the third switch to switch first current between flowing through the first conductive path and flowing through the third conductive path; and
        control the second switch and the fourth switch to switch second current between flowing through the second conductive path and flowing through the fourth conductive path; and
    a current sensor, wherein the first conductive path and the second conductive path bypass the current sensor and the third conductive path and the fourth conductive path are routed through the current sensor, and wherein the current sensor is configured to detect a differential current between the third conductive path and the fourth conductive path,
    wherein the controller is configured to control the first switch and the third switch to switch the first current to flow through the first conductive path for only a first predetermined period of time and to flow through the third conductive path for only a second predetermined period of time.

* * * * *

UNITED STATES PATENT AND TRADEMARK OFFICE
CERTIFICATE OF CORRECTION

PATENT NO. : 10,819,275 B2
APPLICATION NO. : 15/292780
DATED : October 27, 2020
INVENTOR(S) : Glovinsky et al.

Page 1 of 1

It is certified that error appears in the above-identified patent and that said Letters Patent is hereby corrected as shown below:

On the Title Page

The first or sole Notice should read --

Subject to any disclaimer, the term of this patent is extended or adjusted under 35 U.S.C. 154(b) by 940 days.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*